(12) United States Patent  
Hunt et al.

(10) Patent No.: US 8,656,636 B2  
(45) Date of Patent: Feb. 25, 2014

(54) BIOLOGICAL OPTIMIZATION SYSTEMS FOR ENHANCING PHOTOSYNTHETIC EFFICIENCY AND METHODS OF USE

(71) Applicant: University of Georgia Research Foundation, Inc., Athens, GA (US)

(72) Inventors: Ryan W. Hunt, Athens, GA (US); Senthil Chinnasamy, Athens, GA (US); Keshav C. Das, Athens, GA (US); Erico Rolim de Mattos, Athens, GA (US)

(73) Assignee: University of Georgia Research Foundation, Inc., Atlanta, GA (US)

( * ) Notice: Subject to any disclaimer, the term of this patent is extended or adjusted under 35 U.S.C. 154(b) by 0 days.

(21) Appl. No.: 13/632,243

(22) Filed: Oct. 1, 2012

(65) Prior Publication Data

US 2013/0040380 A1    Feb. 14, 2013

Related U.S. Application Data

(62) Division of application No. 13/014,464, filed on Jan. 26, 2011, now Pat. No. 8,302,346.

(60) Provisional application No. 61/298,248, filed on Jan. 26, 2010.

(51) Int. Cl.  
*A01G 7/04*    (2006.01)

(52) U.S. Cl.  
USPC ........... 47/1.4; 47/1.3; 47/DIG. 6; 47/58.1 LS

(58) Field of Classification Search  
USPC ............. 47/1.01 R, 1.3, 1.4, 58.1 R, 58.1 LS, 47/58.1 SE, 17, 39, DIG. 6  
See application file for complete search history.

(56) References Cited

U.S. PATENT DOCUMENTS

| | | | |
|---|---|---|---|
| 5,012,609 A | 5/1991 | Ignatius et al. | |
| 2007/0151149 A1 | 7/2007 | Karpinski | |
| 2010/0115830 A1 | 5/2010 | Dube | |
| 2011/0023565 A1* | 2/2011 | Yanik et al. | 71/11 |

* cited by examiner

*Primary Examiner* — Rob Swiatek  
*Assistant Examiner* — Lisa Tsang  
(74) *Attorney, Agent, or Firm* — Thomas | Horstemeyer, LLP

(57) ABSTRACT

The present disclosure relates to biological optimization systems for enhancing photosynthetic efficiency and methods of use.

12 Claims, 15 Drawing Sheets

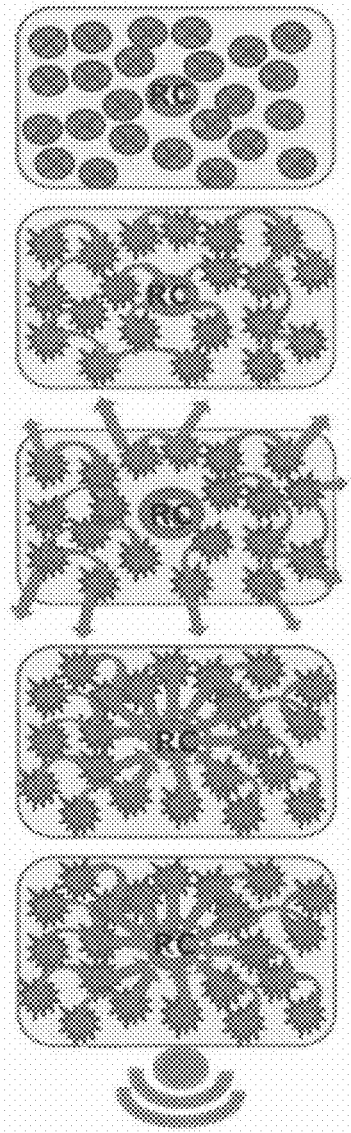
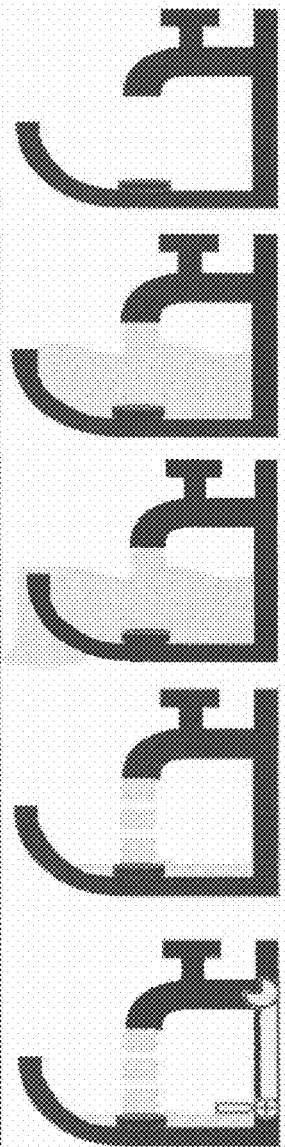

P-L-P Biofeedback System Sink Analogy

1. Dark Adapted antenna complex- All chlorophyll molecules fully oxidized or open including reaction center (RC); i.e. an empty sink and drain.

2. Actinic illumination excites electrons in chlorophyll molecules in the LHC transferring energy to the RC; i.e. excess energy is floating around the sink before it can be emptied through the drain.

3. Strong illumination provides more excitations than the RC can process leading to the excess energy being dissipated as heat- NPQ; i.e. the drain cannot empty the energy sink at the rate it is being filled leading to an overflow.

4. Alternatively, pulsed actinic illumination is applied where just enough excitations are generated and then a dark period is given for the RC to process the remaining excitations; i.e. the faucet is set to a periodic flow rate to match the drain's capacity.

5. To optimize the incident light and dark period, a direct measurement of NPQ is made via Chlorophyll-*a* Fluorescence; i.e. when the flow rate is faster than the drain rate, the sink water level will begin to rise, which is detected by a float valve that directly shuts off the faucet. Once the water drains and the level drops again, the float valve returns the flow to the sink, thus establishing a feedback mechanism to match the drain's capacity.

FIG. 3

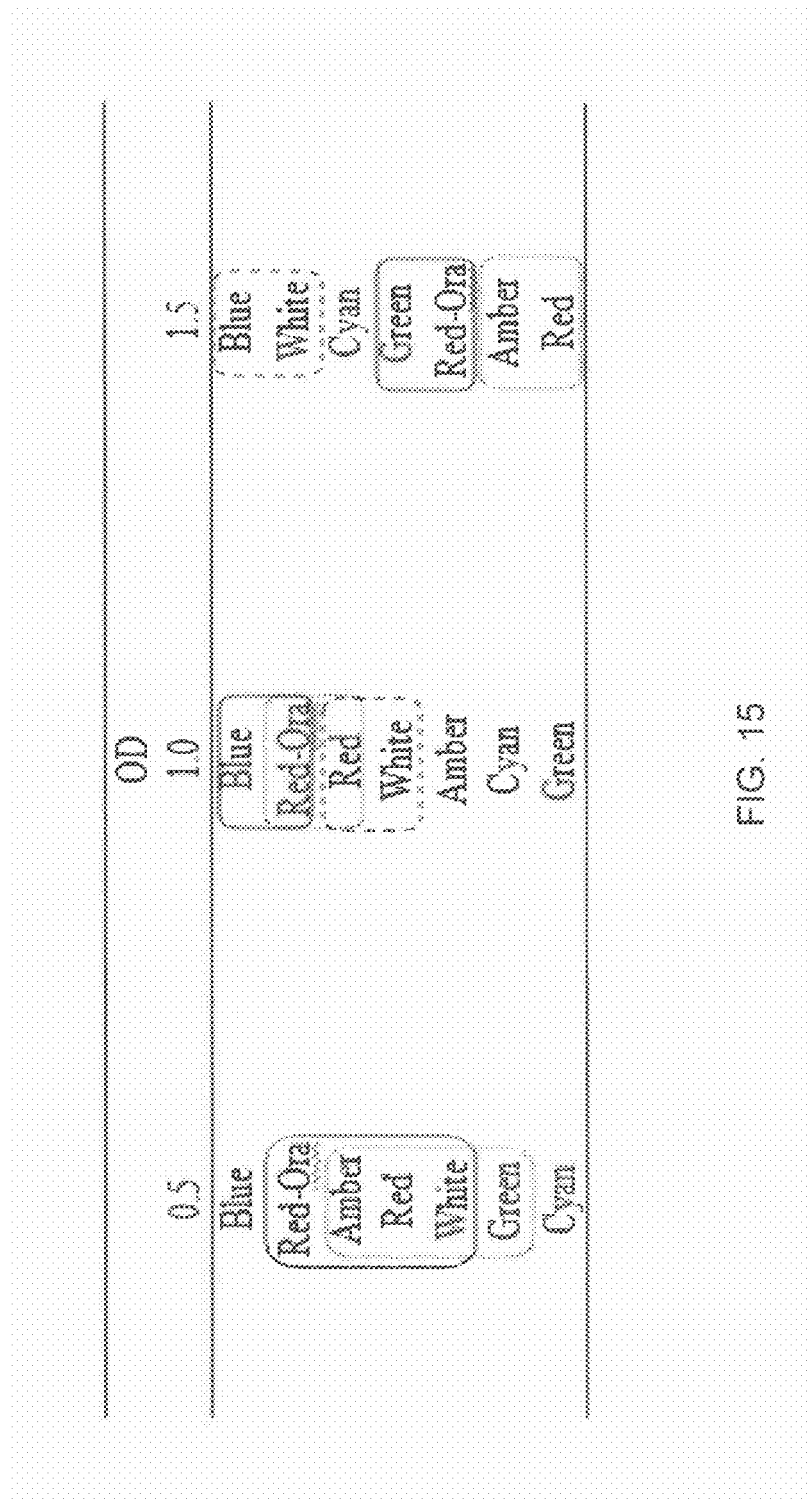

BIOLOGICAL OPTIMIZATION SYSTEMS FOR ENHANCING PHOTOSYNTHETIC EFFICIENCY AND METHODS OF USE

CROSS-REFERENCE TO RELATED APPLICATION

This application is a divisional of U.S. Utility application Ser. No.: 13/014,464 entitled "Biological Optimization Systems for Enhancing Photosynthetic Efficiency and Methods of Use" filed on Jan. 26, 2011 which claims priority to provisional application entitled "Biological Optimization Systems for Enhancing Photosynthetic Efficiency and Methods of Use," having Ser. No. 61/298,248 filed on Jan. 26, 2010, which is entirely incorporated herein by reference.

STATEMENT REGARDING FEDERALLY SPONSORED RESEARCH OR DEVELOPMENT

This invention was made with government support under award number DE-FG36-08GO88144 awarded by the Department of Energy. The government has certain rights in the invention.

BACKGROUND

It has long been known that the "Flashing Light Effect" in Photosynthesis can enhance the light utilization efficiency leading to better productivity. The goal is to apply a photon flux density that is just enough to excite the majority of the light harvesting complexes to attain the maximum rate of growth, while simultaneously minimizing trapped surplus light, which renders losses in the form of heat and fluorescence. The excess absorbed light energy can cause damage to the photosynthetic apparatus from the reactive free oxygen radicals generated, known as photoinhibition. Thus, by using intermittent light, the number of excitations arriving at a closed reaction center decreases when flashes are shortened, permitting more efficient usage of light and less photodamage repair. The major potential boosts in bioproductivity stems from improving flux tolerance rather than from augmenting intrinsic photosynthesis efficiency. The ultimate rate limiting process for improving photonic flux tolerance and thus bioproductivity is the time scale for the dark reactions in algal photosynthesis. The matching of pulse duration, color spectrum, and instantaneous light intensity of the LED light output to the chlorophyll absorption, and subsequent dark reaction kinetics are the key to realizing superior flux tolerance.

Photosynthetic organisms use various pigments to absorb and convert light energy into chemical energy through photosynthesis. These pigments have specific wavelengths of light that are most strongly absorbed, with chlorophyll being the dominant and most important pigment for photosynthesis. Using colors of light that match the absorption of pigments in a particular organism has been shown to be more effective for driving photosynthesis over using full spectrum or weakly absorbed colors. However, as pigment densities increase, such as in the case of high density algal cultures, strongly absorbed wavelengths of light, such as blue and red, become very strongly absorbed at the surface of the culture and less light is allowed to penetrate deep into the culture. The most popular physical observable used to assess photosynthetic function and its subsequent down regulation in excess-light conditions is chlorophyll (Chl) fluorescence, because it is sensitive to a wide range of changes in the overall apparatus. Despite decades of research on the flashing light effect, there have not been any studies on the apparent increase in photon utilization efficiency (yield) or a minimization of non-photochemical quenching (NPQ), or heat dissipation using PAM Fluorometry. Thus, a need exists to address these deficiencies.

SUMMARY

Embodiments of the present disclosure, in one aspect, relate to biological optimization systems for enhancing photosynthetic efficiency and methods of use.

Briefly described, embodiments of the present disclosure include methods for enhancing photosynthetic efficiency, among others, including: applying pulsed light to a photosynthetic organism; using a chlorophyll fluorescence feedback control system to determine one or more photosynthetic efficiency parameters, wherein the photosynthetic efficiency parameters are used to adjust one or more of the following: a pulse rate, pulse on/off duration, light intensity, light spectrum, or a combination thereof; and adjusting one or more of the photosynthetic efficiency parameters to drive the photosynthesis by the delivery of an amount of light to optimize light absorption of the photosynthetic organism while providing enough dark time between light pulses to prevent oversaturation of the chlorophyll reaction centers.

Briefly described, embodiments of the present disclosure include a biological optimization system for enhancing photosynthetic efficiency of a photosynthetic organism including a source of pulsed light and a chlorophyll fluorometer.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

FIG. 3 illustrates a model of a Biofeedback System for Optimizing Photosynthesis using pulse width modulated LEDs and PAM fluorometry.

FIG. 15 illustrates results for LEDs $\phi_{PSII}$ arranged by the lowest to the highest at different culture Optical Density (OD). The LEDs circulated by the same arrows do not show significant differences. Factorial Design analyzes were performed within each OD. Results from different ODs cannot be compared.

DETAILED DESCRIPTION

Figure 1:
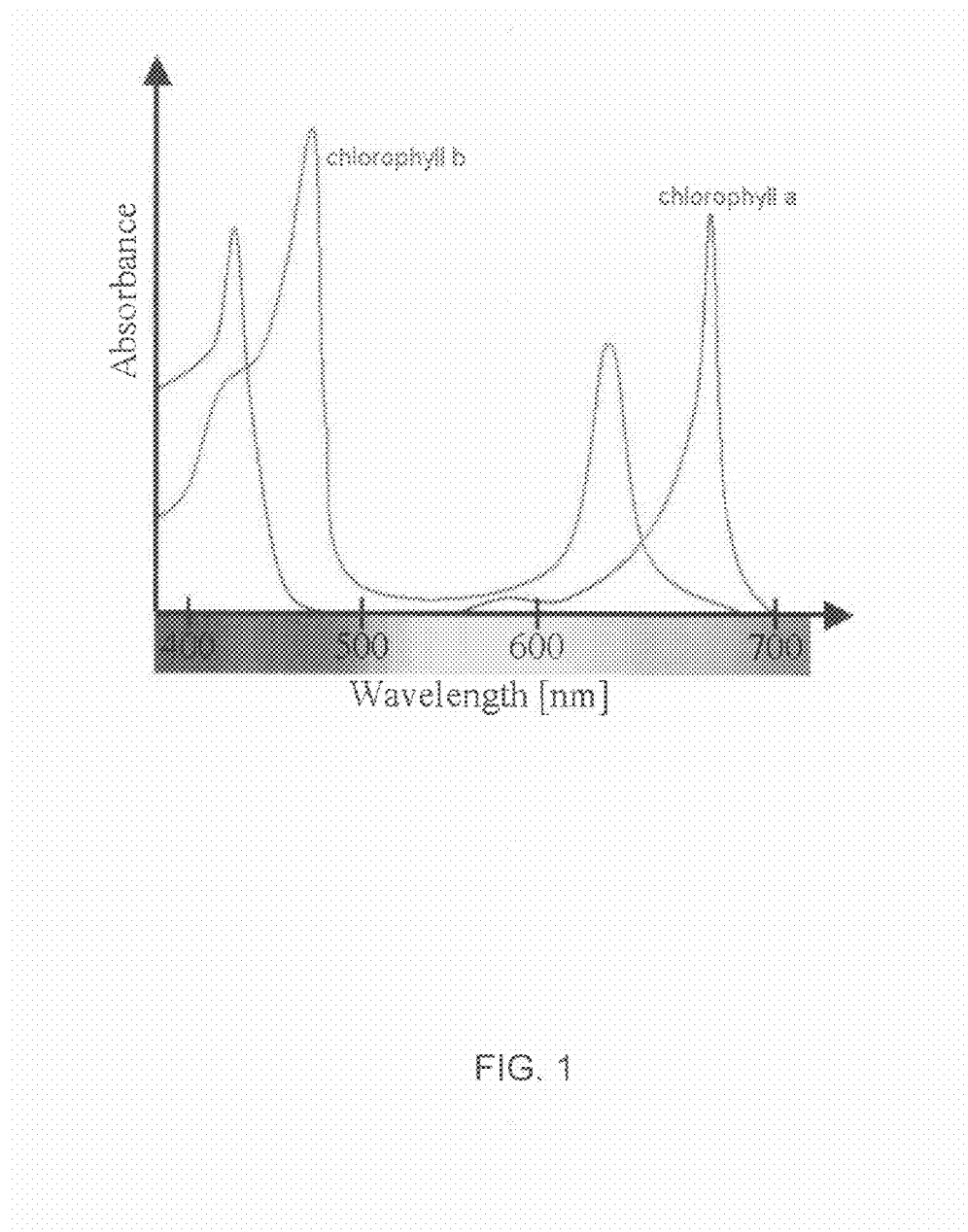
FIG. 1 is a graph that illustrates absorbance spectra of free chlorophyll a and b in a solvent. The spectra of chlorophyll molecules are slightly modified in vivo depending on specific pigment-protein interactions.
Figure 2:
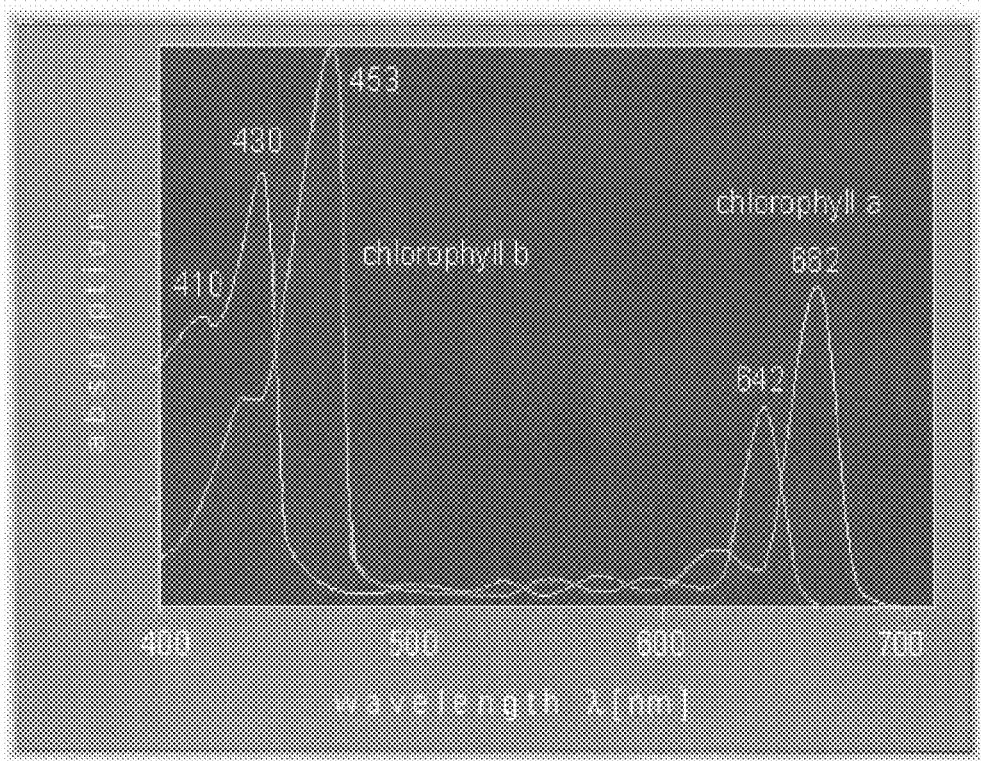
FIG. 2 is a graph that illustrates the absorption maxima of chlorophyll a are lambda=430 and lambda=662 nm, that of chlorophyll b are at 453 and 642 nm. Royal Blue Luxeon K2 LED emits in the 440 nm to 460 nm range with a peak emission at 455 nm, with spectral half-width of 20 nm, very appropriate to excite chlorophyll a and nearly an exact match to excite chlorophyll b. Red Luxeon K2 LED emits in the 620.5 nm to 645 nm, with peak emission at 627 nm and spectral half-width of 20 nm, appropriate to excite chlorophyll b. Therefore, it is NOT obvious, based solely on Chlorophyll a and b spectra, that green light would enhance algae growth and metabolism.
Figure 4:
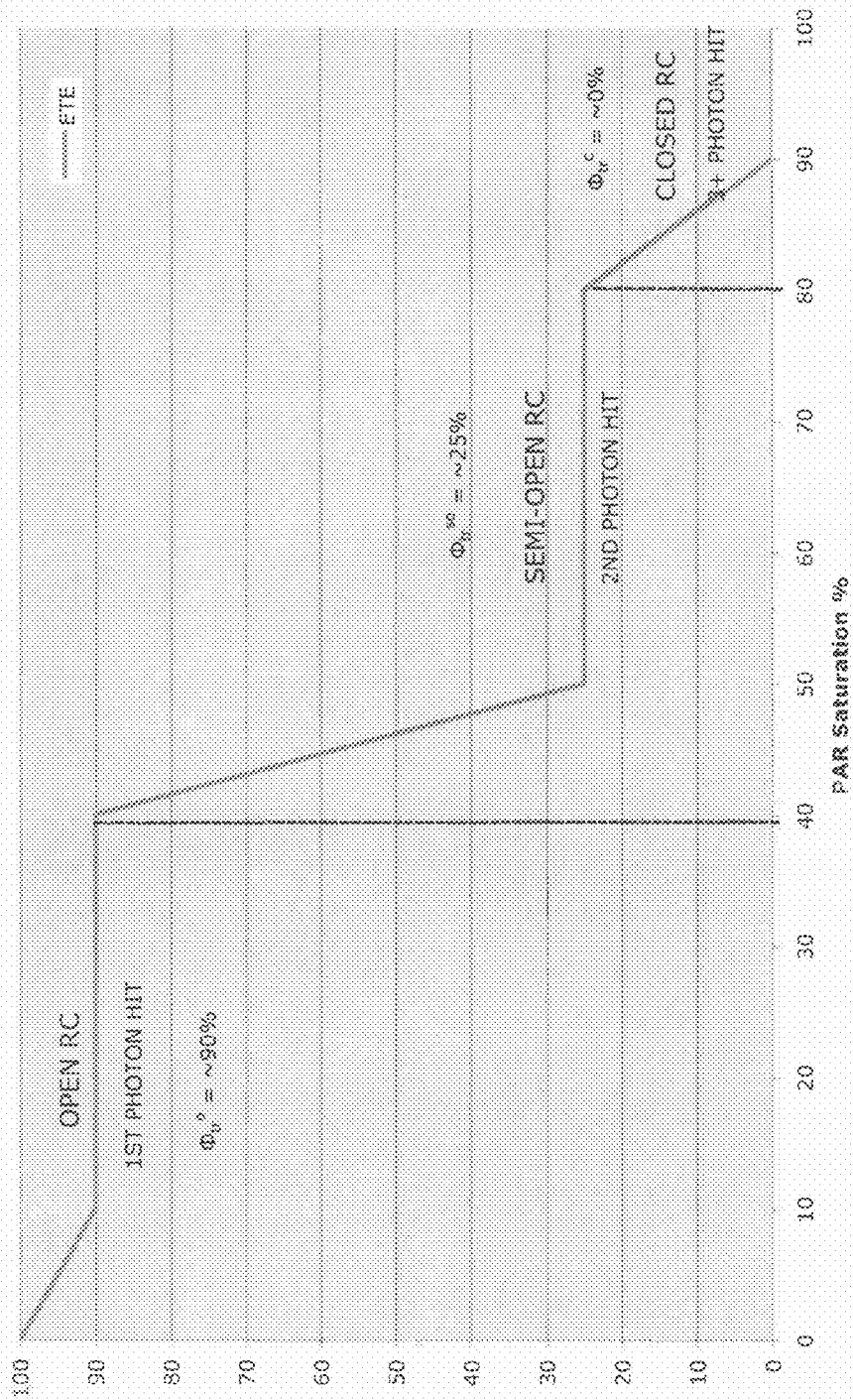
FIG. 4 is a graph that illustrates Electron Trapping Efficiency vs. PAR saturation.
Figure 5:
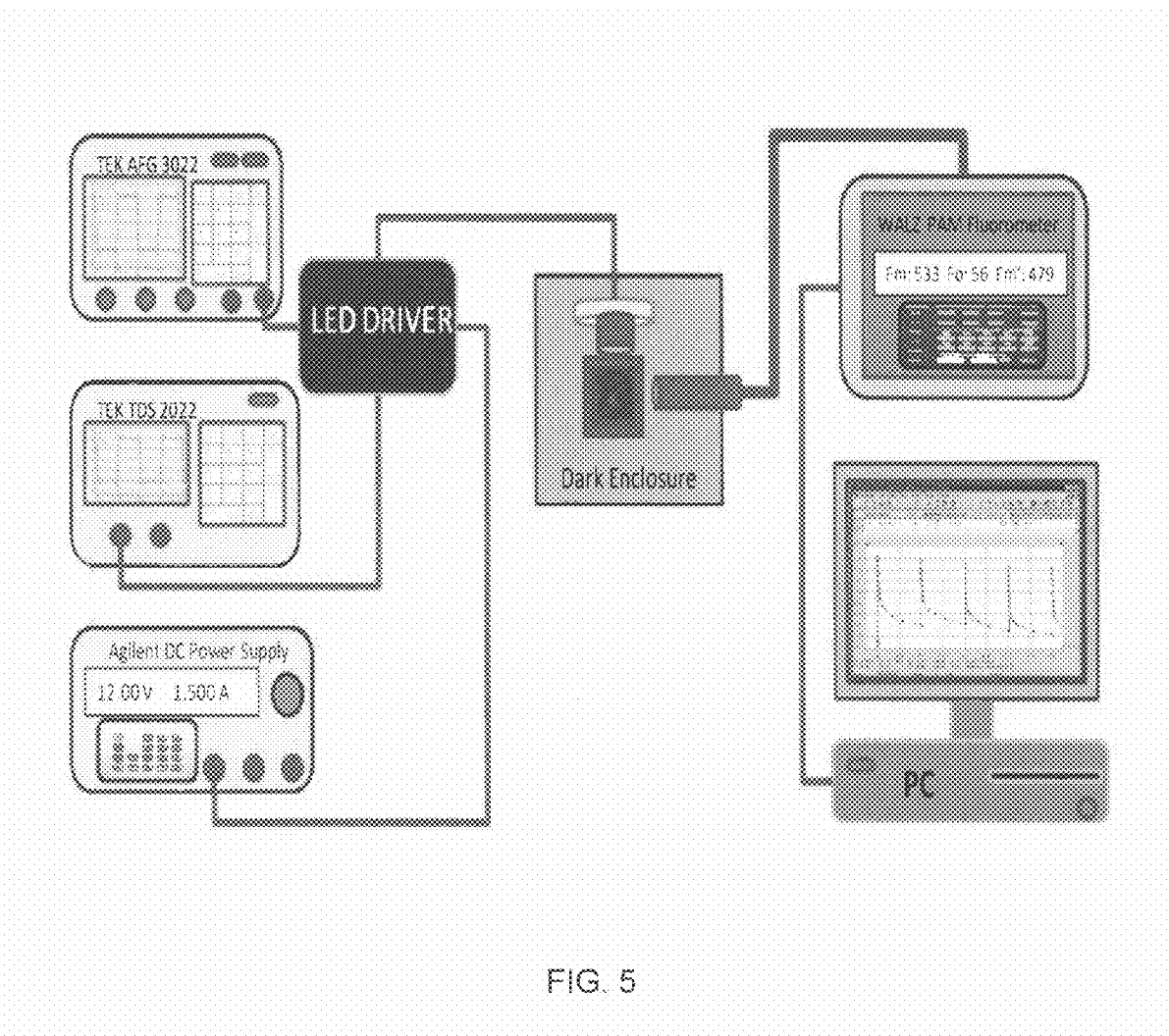
FIG. 5 illustrates an experimental setup as discussed in Example 1, below.

Before the present disclosure is described in greater detail, it is to be understood that this disclosure is not limited to particular embodiments described, as such may, of course, vary. It is also to be understood that the terminology used herein is for the purpose of describing particular embodiments only, and is not intended to be limiting, since the scope of the present disclosure will be limited only by the appended claims.

Where a range of values is provided, it is understood that each intervening value, to the tenth of the unit of the lower limit (unless the context clearly dictates otherwise), between the upper and lower limit of that range, and any other stated or intervening value in that stated range, is encompassed within the disclosure. The upper and lower limits of these smaller ranges may independently be included in the smaller ranges and are also encompassed within the disclosure, subject to any specifically excluded limit in the stated range. Where the stated range includes one or both of the limits, ranges excluding either or both of those included limits are also included in the disclosure.

Unless defined otherwise, all technical and scientific terms used herein have the same meaning as commonly understood by one of ordinary skill in the art to which this disclosure belongs. Although any methods and materials similar or equivalent to those described herein can also be used in the practice or testing of the present disclosure, the preferred methods and materials are now described.

All publications and patents cited in this specification are herein incorporated by reference as if each individual publication or patent were specifically and individually indicated to be incorporated by reference and are incorporated herein by reference to disclose and describe the methods and/or materials in connection with which the publications are cited. The citation of any publication is for its disclosure prior to the filing date and should not be construed as an admission that the present disclosure is not entitled to antedate such publication by virtue of prior disclosure. Further, the dates of publication provided could be different from the actual publication dates that may need to be independently confirmed.

As will be apparent to those of skill in the art upon reading this disclosure, each of the individual embodiments described and illustrated herein has discrete components and features which may be readily separated from or combined with the features of any of the other several embodiments without departing from the scope or spirit of the present disclosure. Any recited method can be carried out in the order of events recited or in any other order that is logically possible.

The following examples are put forth so as to provide those of ordinary skill in the art with a complete disclosure and description of how to perform the methods and use the compositions and compounds disclosed and claimed herein. Efforts have been made to ensure accuracy with respect to numbers (e.g., amounts, temperature, etc.), but some errors and deviations should be accounted for. Unless indicated otherwise, parts are parts by weight, temperature is in ° C., and pressure is at or near atmospheric. Standard temperature and pressure are defined as 20° C. and 1 atmosphere.

It must be noted that, as used in the specification and the appended claims, the singular forms "a," "an," and "the" include plural referents unless the context clearly dictates otherwise. Thus, for example, reference to "a support" includes a plurality of supports. In this specification and in the claims that follow, reference will be made to a number of terms that shall be defined to have the following meanings unless a contrary intention is apparent.

Definitions:

The terms "algae" and "algal cells" as used herein refer to a large and diverse group of simple, typically autotrophic organisms, ranging from unicellular to multicellular forms. They are photosynthetic, like plants, and "simple" because they lack the many distinct organs found in land plants. All true algae have a nucleus enclosed within a membrane and chloroplasts bound in one or more membranes. "Microalgae" or "microphytes" (also referred to as phytoplankton, or planktonic algae) are microscopic algae, typically found in freshwater and marine systems. There are 200,000-800,000 species exist of which about 35,000 species are described. They are unicellular species which exist individually, or in chains or groups. Depending on the species, their sizes can range from a few micrometers (μm) to a few hundreds of micrometers. Microalgae produce approximately half of the atmospheric oxygen and use simultaneously the greenhouse gas carbon dioxide to grow photoautotrophically. The biodiversity of microalgae is enormous and they represent an almost untapped resource. The chemical composition of microalgae is not an intrinsic constant factor but varies over a wide range, both depending on species and on cultivation conditions. Microalgae such as microphytes constitute the basic foodstuff for numerous aquaculture species, especially filtering bivalves. They provide them with vitamins and polyunsaturated fatty acids, necessary for the growth of the bivalves which are unable to synthesize it themselves.

"Quantum Yield" (Yield) refers to the proportion of light absorbed by chlorophyll associated with PSII that is used in photochemistry.

"Non-photochemical Quenching" (NPQ) refers to thermal dissipation of absorbed energy within the PSII pigment antenna and/or RCII.

"Chlorophyll Fluorescence" refers to re-emission of energy in the form of a photon (light) as an electron returns to ground state from a singlet excited state.

"Pulse-Amplitude-Modulation Fluorometry" refers to the measure of the fluorescence characteristics of the different states of a reaction center. Using a probe flash PAM measures the changes in the quantum yield of fluorescence.

The "Feedback Control System" refers to a system that is based on fluorescent measurements of fluorescence from the chlorophyll (as measured by the fluorometer), where the system is capable of immediate detection of responses from the photosynthetic organism. A device (e.g., a datalogger, a computer (hardware and/or software) in communication with the Fluorometer, and the LED illumination system (e.g., one or more LEDs that can be individually controlled by the device and/or manually, where each LED can be emit at a different wavelength(s)), can adjust the light intensity, spectrum, and/or pulse of one or more of the LEDs to better match the needs of photosynthetic organism so to maximize the growth of the photosynthetic organism and maximize the energy efficiency of the LED illumination system.

Discussion:

In accordance with the purpose(s) of the present disclosure, as embodied and broadly described herein, embodiments of the present disclosure, in one aspect, relate to biological optimization systems for enhancing photosynthetic efficiency and methods of use.

In high density algal cultures, high agitation and turnover rates can be used to provide more cells a better opportunity to absorb light energy for photosynthesis. As the density of algae, or concentration of chlorophyll in a given area increases, the color of actinic light can be adjusted from blue (440-490 nm), which is strongly absorbed, to cyan (505 nm) or green (530 nm), which is more weakly absorbed but has higher internal reflection allowing the light energy to penetrate deeper into the culture or canopy. This can allow an overall increase in photosynthesis in the given area. As photosynthetic organisms age, the distribution of pigments may change, which can alter the optimal absorption spectra for a given organism. Measuring the changes in pigment density and optimal color absorption in real-time, allows for an automated optimization (e.g., adjust wavelength, pulse rate, light intensity, and the like) of light absorption by a given photosynthetic organisms culture or canopy.

Chlorophyll fluorescence may be used to assess photosynthetic function and its subsequent down regulation in excess-light conditions. By using data from fluorometry (e.g., PAM fluorometry) on photosynthetic yield and/or NPQ from chlorophyll fluorescence, and coupling this information in real-time for feedback control to adjust actinic light parameters for driving photosynthesis, such as pulse on/off duration, LED color, and/or light intensity, one can optimize (e.g., increase) photosynthetic efficiency and biomass productivity.

Embodiments of the present disclosure include photosynthetic organisms including a plant or animal utilizing chlorophyll as an energy collector/converter. In an embodiment, the photosynthetic organism can include microalgae, macroalgae, terrestrial plant, coral, corallimorph, anemone, claim, a host organism containing a photosynthetic symbiotic organism, and a combination thereof. In another embodiment, the microalgae can include *Chlorella sorokiniana*, *Chlorella minutissima*, and a combination thereof.

Embodiments of the present disclosure can include a biological optimization system where the chlorophyll fluorometer provides chlorophyll fluorescence feedback to a chlorophyll fluorescence feedback control system (e.g., a fluorometer, datalogger or computer system, and an LED illumination system) where the chlorophyll fluorescence feedback control system adjusts the output of the source(s) of pulsed light. In an embodiment, the chlorophyll fluorescence feedback includes photosynthetic efficiency (quantum yield), photochemical processing (qP), and/or waste heat dissipation (NPQ or qN) of the photosystem. The parameters can be calculated based on chlorophyll a fluorescence emissions. In an embodiment, the chlorophyll fluorescence feedback can be utilized to adjust one or more of: a pulse rate, pulse on/off duration, light intensity, and/or light spectrum, of the source of pulsed light to provide an amount of light to excite the photosynthetic organism without oversaturation and photoinhibition with less energy loss through heat dissipation (NPQ). In an embodiment of the present disclosure, the pulse rate, pulse on/off duration, light intensity, and/or light spectrum are adjusted during illumination based upon the chlorophyll fluorescence feedback data in real time. In an embodiment, the need for non-photochemical quenching by the organism is reduced, as compared to continuous illumination systems.

Embodiments of the present disclosure include a biological optimization system where the light intensity of the spectral composition of light from the illumination can change by decreasing the intensity of wavelengths that are strongly absorbed and increasing the intensity of wavelengths that are weakly absorbed to allow deeper penetration of light energy into a culture or canopy of the photosynthetic organism. The change in illumination spectrum is based upon changes in the ratio and quantity of the composition of photosynthetic pigments in the targeted organism.

In an embodiment, the illumination applies blue (440-490 nm) and/or red (600-680 nm) light to the culture or canopy, when the culture or canopy has strong absorption in the blue (440-490 nm) and/or red (600-680 nm) regions.

Embodiments of the present disclosure include a biological optimization system where the illuminated culture increases its density during cultivation preventing effective light penetration into the culture or canopy and inducing increased energy dissipation as heat (NPQ), where the biological optimization system decreases the intensity of blue and/or red illumination and replaces the intensity of illumination with one or more colors having higher reflection, wherein the colors having higher reflection can include cyan (495-515 nm), green (520-540 nm), orange/amber (565-595 nm), and a combination thereof. Other types of adjustments to one or more of the pulse rate, pulse on/off duration, light intensity, or light spectrum, of the source of pulsed light can be adjusted in a similar fashion as the photosynthetic organism grows and changes.

As mentioned above, embodiments of the present disclosure can include a biological optimization system for enhancing photosynthetic efficiency that includes a source of pulsed light (e.g., LED illumination system) and a chlorophyll fluorometer (e.g., a Pulse Amplitude Modulation (PAM) fluorometer). In an embodiment, the system enhances photosynthetic efficiency of a photosynthetic organism. Embodiments of the present disclosure include a biological optimization system where trapped surplus light is minimized. In an embodiment, the energy required by the source of pulsed light is minimized. Additional details are provided in the Examples.

As mentioned above, embodiments of the present disclosure include optimization of photon utilization efficiency (e.g., increase power use) and/or photoinhibition prevention in photosynthetically active organisms under pulsed actinic illumination. In an embodiment, PAM fluorometry may be used as a diagnostic tool to measure fluorescence from the photosynthetic organism. In another embodiment, data acquired using the PAM flourometer can provide an assessment of the overall photosynthetic state of the photosynthetic organism. The PAM fluorometer provides information (e.g., photosynthetic efficiency parameters) about a photosynthetic organism's use of chlorophyll for absorbing light energy. The PAM can be used diagnostically to determine what fraction of absorbed light is used for photochemistry, re-emitted as fluorescence, and/or dissipated as heat energy. These three fates of absorbed light energy provide an instantaneous assessment of how efficient the organism is operating under its current environmental conditions.

Embodiments of the present disclosure can provide real time information and fast dynamic tuning of the LED illumination system in an automated, compact package. By combining the fluorometer (e.g., fluorometer PAM) and LED illumination system (source of pulsed light from LED(s) at one or more wavelengths) and coupling them with a feedback loop that takes information from the fluorometer, the data then can be used to adjust the LED(s) light output (e.g., intensity, color, and/or pulse on/off duration). In an embodiment, the information from the PAM fluorometer can be analyzed using an algorithm. In other words, the LED light from the LED illumination system can become a "smart" grow light, in the sense that it can maximize the efficient absorption and conversion of each photon emitted from the LED(s), whereby maximizing the photosynthetic efficiency as well as maximizing the energy used by the LED illumination system. As the PAM fluorometer measures the chlorophyll fluorescence of an organism with and without LED illumination, the resultant data on the efficiency and waste of its current photosynthetic performance can be used to adjust and dynamically tune the output energy (e.g., intensity, color, and/or pulse on/off duration) from the LED illumination in real-time to maximize the performance of the organism.

Embodiments of the present disclosure may be used to optimize artificial illumination (e.g., from the LED illumination system) for cultivation of plants or algae. In an embodiment, microalgae cultivation for food, feed, nutraceutical, and biofuel production, agriculture, horticulture, and/or coral aquaculture may be realized. In situations where it is economical to use artificial lighting for the cultivation of high value photosynthetic organisms, embodiments of the present disclosure can potentially increase the biomass productivity and/or light utilization efficiency, i.e., the energy used to generate light in the photosynthetically active region (PAR) can be dramatically decreased by being able to maximize the absorption and utilization (through photochemical conversion/photosynthesis) of the light energy by the organism. In an embodiment, use of high efficiency LED's that are being pulsed with 50% or less on-time at monochromatic colors can optimize absorption into the culture or canopy, which can lead to decrease in energy costs. The reduced on-time of one or more of the LEDs can decrease electricity usage directly and indirectly by reducing the cooling requirements, which is particularly applicable in indoor enclosures or heat sensitive operations.

In general, the artificial lighting currently used in industry for photosynthetic organisms, such as metal halides, high pressure sodium, mercury-arc, etc, has tremendous losses associated with the generation of PAR light, due to losses in the IR and UV light region, electronic ballast inefficiencies, and external chiller/cooling requirements for enclosed operations. In addition, these high intensity lights can readily induce photoinhibition and/or photodamage that can decrease productivities. These lights also do not have the ability to decrease light intensity, change spectrum, and/or provide pulsed/intermittent light to the organism.

Embodiments of the present disclosure can include methods for enhancing photosynthetic efficiency. An embodiment includes applying light (e.g., pulsed light of one or more different colors) to a photosynthetic organism and then using a chlorophyll fluorescence feedback control system to maximize the growth of the photosynthetic organism and maximize the energy efficiency of the light system (e.g., LED illumination system). In an embodiment, the chlorophyll fluorescence feedback control system includes the photosynthetic organism, a chlorophyll fluorometer (or similar chlorophyll fluorescence detection apparatus), and a LED illumination system (e.g., a LED lighting apparatus that can include one or more LEDs at one or more colors (e.g., white, red, green, orange, green, and blue, light). The chlorophyll fluorometer (or a waveguide or optical fiber to direct the energy to the fluorometer) is disposed adjacent the surface of the photosynthetic organism to receive fluorescent energy emitted by the photosynthetic organism, while the LED illumination system directs light energy onto the photosynthetic organism. The chlorophyll fluorescence feedback control system measures and monitors fluorescent energy emitted by the photosynthetic organism (e.g., as a function of time) and uses it to generate photosynthetic efficiency parameters (e.g., photosynthetic efficiency, photochemical processing, and waste heat dissipation). One or more of the photosynthetic efficiency parameters can be used to adjust a pulse rate, pulse on/off duration, light intensity, and/or light spectrum, of the LED illumination system for driving photosynthesis by the delivery of an amount of light to optimize (e.g., increase) light absorption of the photosynthetic organism, while providing enough dark time between light pulses to prevent oversaturation of the chlorophyll reaction centers, which can induce photo-inhibition and photo-oxidation. In order to reduce or prevent oversaturation, time between the pulses should be provided so the photosynthetic organism can re-oxidize the reactions centers. The pulse rate, pulse on/off duration, and/or light intensity of one or more of the LEDs in the LED illumination system can be adjusted to maximize the light absorption of the photosynthetic organism and/or reduce the energy used the LED illumination system. Additional details are described in the Examples.

In an embodiment of the present disclosure, the pulsed light is derived from a LED illumination system. The LED illumination system can include a light source that includes one or more a Light-Emitting Diode (LED) or Organic Light-Emitting Diode (OLED), where the LED(s) can emit light at different wavelengths. Each of the LEDS in the LED illumination system can be operated at a pulse rate of: about 500 Hz, about 1,000 Hz, about 2,000 Hz, about 2,500 Hz, about 3,000 Hz, about 3,500 Hz, about 4,500 Hz, about 5,000 Hz, about 20,000 Hz, and about 50,000 Hz. In an embodiment, the pulse rate is between about 500 Hz to 10 kHz. Each of the LEDS in the LED illumination system can be operated at a wavelength of: blue LED (440-490 nm), cyan LED (505 nm), white LED (2700 k-10,000 k), red LED, green LED, orange/amber LED, and the like, and a combination thereof. Embodiments of the present disclosure can include one or more Pulse Width-Modulated Light-Emitting Diode (PWM-LED) as a source of one or more of the wavelengths of the pulsed light.

Embodiments of the present disclosure include a biological optimization system where the energy required by the source of pulsed light is decreased due to the duty-cycle of 50% or less (i.e., the off-times between each LED pulse).

EXAMPLES

Example 1

Introduction:

It has long been known that the "Flashing Light Effect" in Photosynthesis can enhance the light utilization efficiency leading to better productivity (Kok, 1953; Phillips and Myers, 1954). The goal is to apply a photon flux density that is just enough to excite the majority of the light harvesting complexes to attain the maximum rate of growth, while simultaneously minimizing trapped surplus light, which renders losses in the form of heat and fluorescence. The excess absorbed light energy can cause damage to the photosynthetic apparatus from the reactive free oxygen radicals generated, known as photoinhibition. Thus, by using intermittent light, the number of excitations arriving at a closed reaction center decreases when flashes are shortened, permitting more efficient usage of light and less photodamage repair (Matthijs et al., 1995). The major potential boosts in bioproductivity stems from improving flux tolerance rather than from augmenting intrinsic photosynthesis efficiency. The ultimate rate limiting process for improving photonic flux tolerance and thus bioproductivity is the time scale for the dark reactions in algal photosynthesis. The matching of time pattern, spectrum and instantaneous intensity of pulsed LED photonic input to the dark reaction kinetics is the key to realizing superior flux tolerance (Gordon and Polle, 2007).

The most common physical observable used to assess photosynthetic function and its subsequent down regulation in excess-light conditions is chlorophyll (Chl) fluorescence, because it is sensitive to a wide range of changes in the overall apparatus (Holt et al., 2004). Despite decades of research on the flashing light effect, there have not been any studies on the apparent increase in photon utilization efficiency or a minimization of non-photochemical quenching, or heat dissipation using PAM Fluorometry.

In this Example, PAM Fluorometry has been used to probe PSII under intermittent actinic illumination in order to provide bioenergetic information regarding the effective quantum yield, photochemical quenching and non-photochemical quenching of the photosynthetic organism under investigation. This research demonstrates that PAM Fluorometry can be implemented as a diagnostic tool for optimization of photon utilization efficiency and photoinhibition prevention under pulsed actinic illumination for photosynthetically active organisms. This research has focused on the microalgae, *Chlorella sorokiniana* and *Chlorella minutissima* as model chlorophyll containing organisms; however, without being bound by any particular theory, it is believed that this phenomenon will apply to any photosynthetically active organism with PSII. This research elucidates that PAM Fluorometry coupled with a feedback controlled Pulse-Width-Modulated LED actinic illumination system applying various waveform parameters can optimize artificial illumination for various applications such as high-density algal cultivation systems in photobioreactors. The technology developed through this research can be used for microalgae cultivation for food, feed, nutraceutical and biofuel production, agriculture, horticulture and coral aquaculture.

Discussion:

The application of intermittent light decreases the number of excitations arriving at a closed reaction center, decreasing the need to dissipate excess energy as heat, while permitting more efficient use of light and less photo-damage repair. An objective of this study was to investigate the biophysics of the "flashing light effect" under various intermittent illumination parameters to optimize maximum photon utilization efficiency by using the PAM Fluorometry as a biological feedback mechanism. The biofeedback system will provide a data stream that can be used to tune the pulse rate and light intensity of the LED's in order to provide precisely enough light to excite the photosystem without over-saturation, thereby minimizing trapped surplus light, which will render losses such as fluorescence, excess heat dissipation and potential oxidative damage to the system.

As the PAR intensity increases, the ability of the LHC's to efficiently harvest the photon/exciton into effective electron transport diminishes. The fluorescence emitted from the light harvesting complex increases with incident PAR, which is indicative of the amount of light saturation achieved within the chloroplast. Continuous light produces more fluorescence, approximately 3 times more at 200 $\mu mol\, m^{-2} s^{-1}$ indicating that at this light intensity, the majority of the RC's have absorbed one photon and are now in the semi-open state exhibiting an electron trapping efficiency of 25%. At higher light intensities, the continuously illuminated culture's electron trapping efficiency drops to 0% as RC's become completely saturated and closed, whereas the pulsed light is still able to tolerate the larger flux by still being able to trap 25% of the excitons. Standard PAM protocol uses an induction curve which provides a single actinic light intensity over a preset period of time. This allows measurements of chlorophyll a fluorescence in the steady state condition over extended exposure. Alternatively, a light curve is another method to determine the photosynthetic efficiencies and quenching dynamics of photosystem at various light intensities. This light curve can be used to determine the minimal light intensity to saturate the majority of the LHC's to a semi-open and closed state.

Materials and Methods:

PAM Fluorometer Measurements

The Pulse-Amplitude-Modulation Fluorometer (Mini-PAM, WALZ GmBH, Germany) measurements were performed in real-time using an external Pulse-Width Modulated LED light source as the actinic light source during the PAM measurements of $\phi_{PSII}$, qP, NPQ. The culture was cultivated under continuous illumination at 200 $\mu mol\, m^{-2} s^{-1}$ and was then dark adapted for one hour before measurements. The measuring light source in PAM was a red LED, 650 nm with a standard intensity 0.15 $\mu mol\, m^{-2} s^{-1}$ PAR. The halogen light for continuous studies emits a maximum 6,000 $\mu mol\, m^{-2}\, s^{-1}$ PAR with continuous actinic illumination and a maximum 18,000 $\mu mol\, m^{-2}\, s^{-1}$ PAR during saturation pulses. The modulation of the measuring light can be set to a modulation frequency 0.6 or 20 kHz. For the PWM-LED, the 20 kHz setting was used for the measuring light frequency in order to attain highest resolution possible of the chlorophyll a fluorescence measurements.

Fluorescence Quenching Analysis

Optimal Quantum Yield: After dark-adaptation.

$$QY=(Fm-Fo)/(Fm)$$

Effective Quantum Yield: Under Actinic Illumination.

$$QY=(Fm'-F)/(Fm')$$

Photochemical Quenching: Energy used for the Calvin-Benson Cycle.

$$qP=(Fm'-F)/(Fm'-Fo')$$

Nonphotochemical Quenching: Dissipation of excess light energy in any way other than through photochemical quenching.

$$NPQ=(Fm-Fm')/Fm'$$

Pulse-Width-Modulated Light Emitting Diode Actinic Illumination System

For these preliminary experiments, a single high powered LED Luxeon K2 LED-Royal was driven via a custom built PWM circuit at 475 mW @1000 mA Constant Current using an Agilent E3631A—Triple Output DC Power Supply. The pulse rates used in the experiments were: 500; 1,000; 1,500; 2,000; 2,500; 3,000; 3,500; 4,500; 5,000; 20,000; 50,000 Hz. The radiometric light intensity of the LED was measured by a Li-Cor Quantum Sensor: LI-190. The halogen light used for control was also calibrated using this sensor and was set accordingly to output the same amount of $\mu moles * m^{-2}\, s^{-1}$. The waveform of the PWM circuit was driven by a TTL output from a Tektronix AFG3022B-Arbitrary Wave Function Generator, and monitored by a Tektronix TDS 2022-Digital Oscilloscope.

Figure 6:
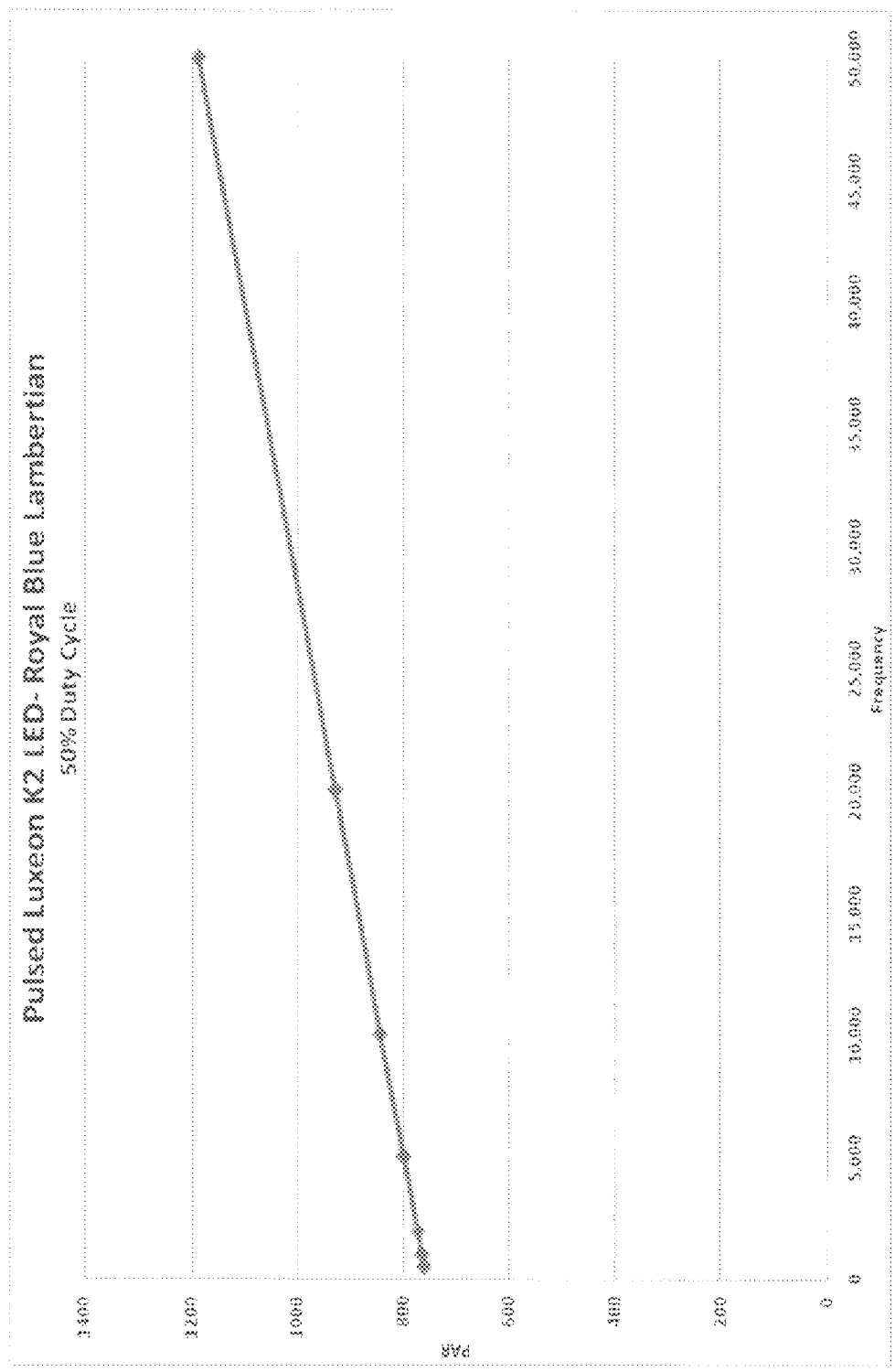
FIG. 6 is a graph that illustrates radiometric output for PWM-LED's.

The frequency and intensity regimes are given in FIG. 6. The light pulse waveforms offer a particular time sequence for the pulses that persist no longer than tens to hundreds of pseconds, but also as the frequency increases, the current draw of the LED also slightly increases providing an elevated instantaneous photon flux for each pulse. Here the averaged photonic intensity are kept equal among treatments, while postponing the onset of light saturation to higher averaged photonic values. It has been noted that by solely chopping a continuous light signal into pulses without increasing the instantaneous photon flux cannot noticiebly improve bioproductivity, but optimal pulsing can (Gordon and Polle, 2007).

Results

Experimental Run: 1
Species: *Chlorella sorokiniana*
Pulse frequency used
  1 kHz
  2 kHz
  5 kHz
  10 kHz
Control PAR: Halogen-780, 1160 μmoles/m$^2$/s
Culture was dark adapted for 1 hour
Light Induction Curve for 5:00 minutes

Figure 7:
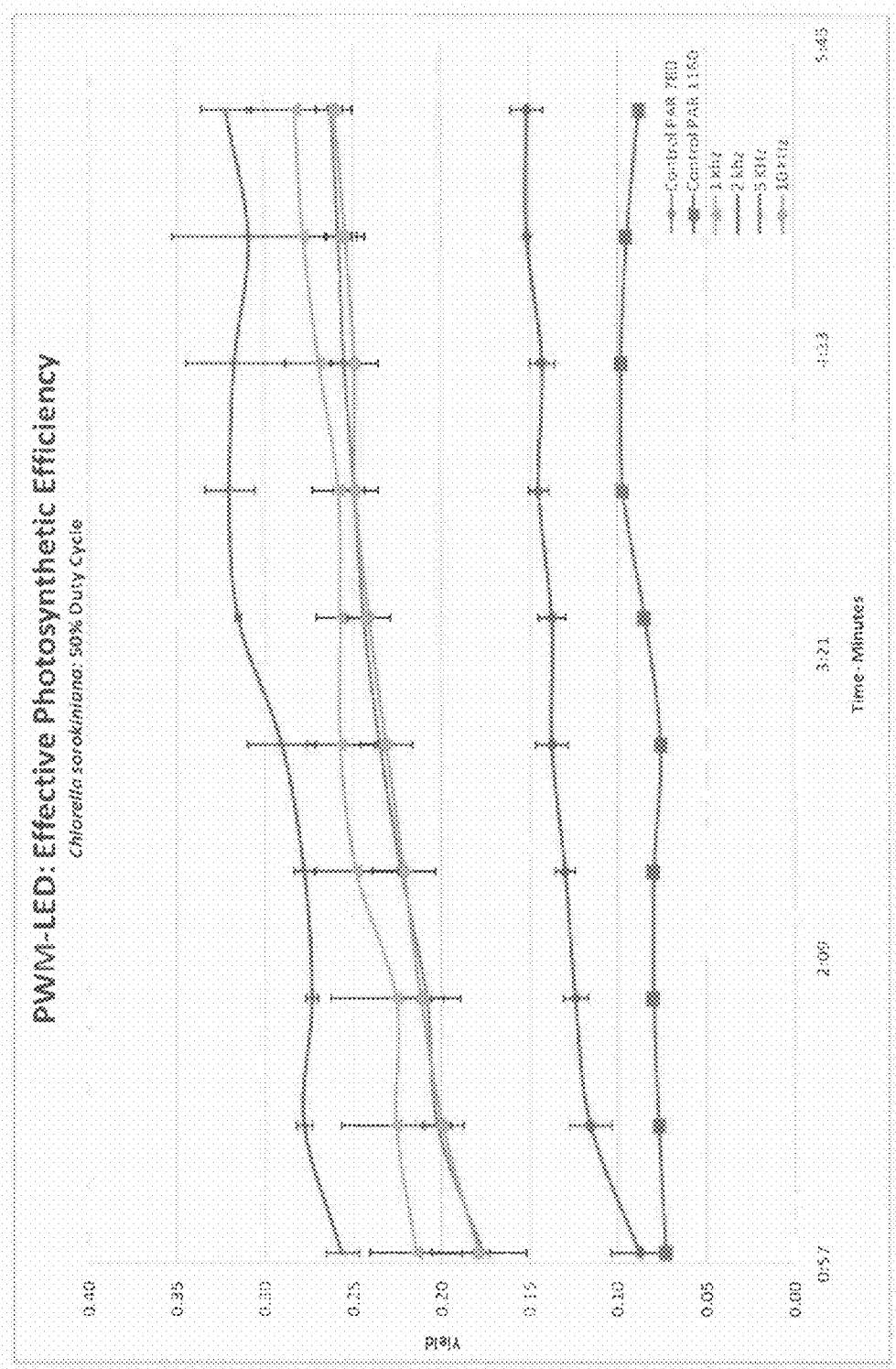
FIG. 7 is a graph that illustrates Effective Photosynthetic Efficiency (Yield) of $C.$ $sorokiniana$.
Figure 8:
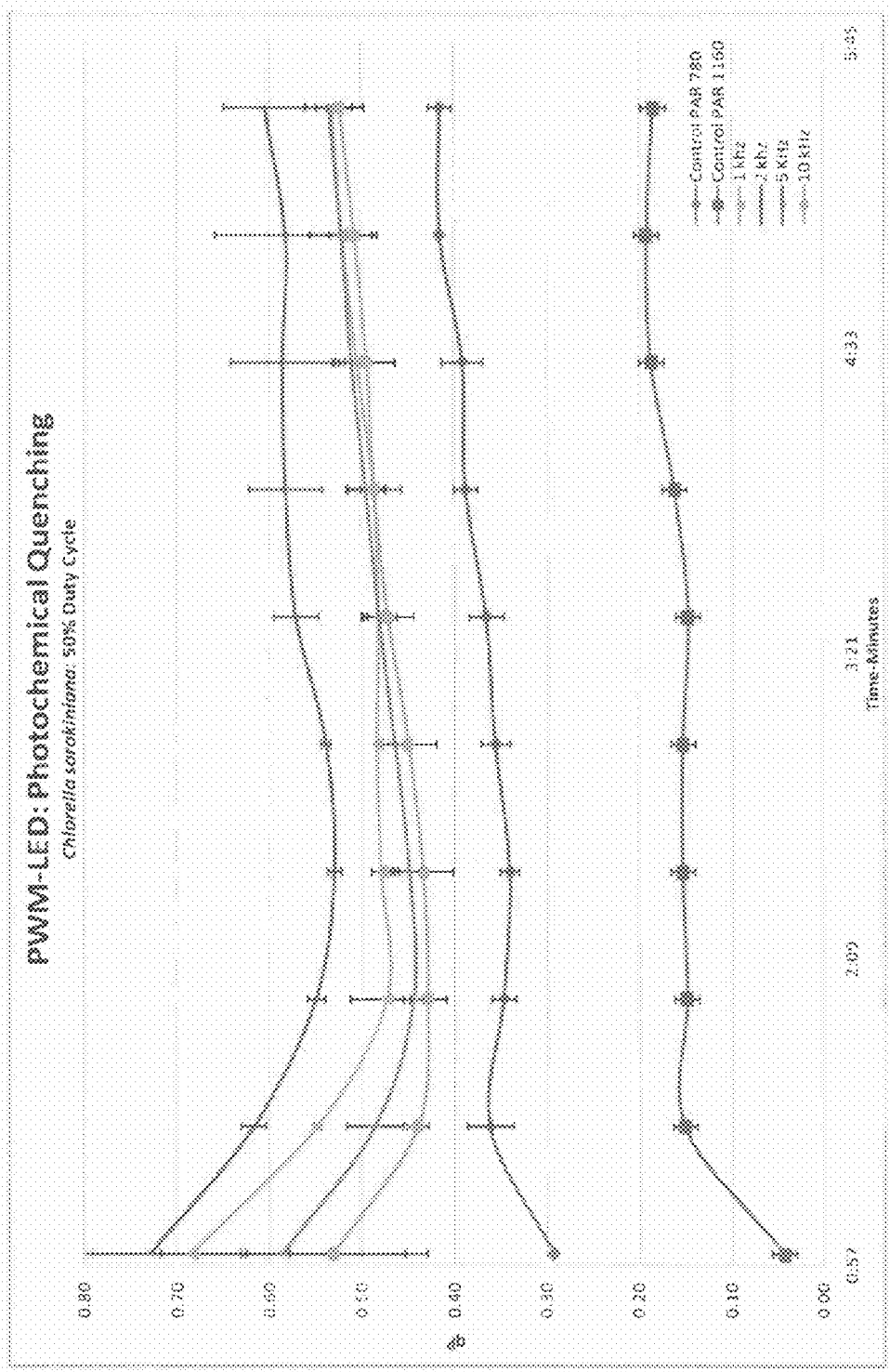
FIG. 8 is a graph that illustrates Photochemical quenching (qP) of $C.$ $sorokiniana$.
Figure 9:
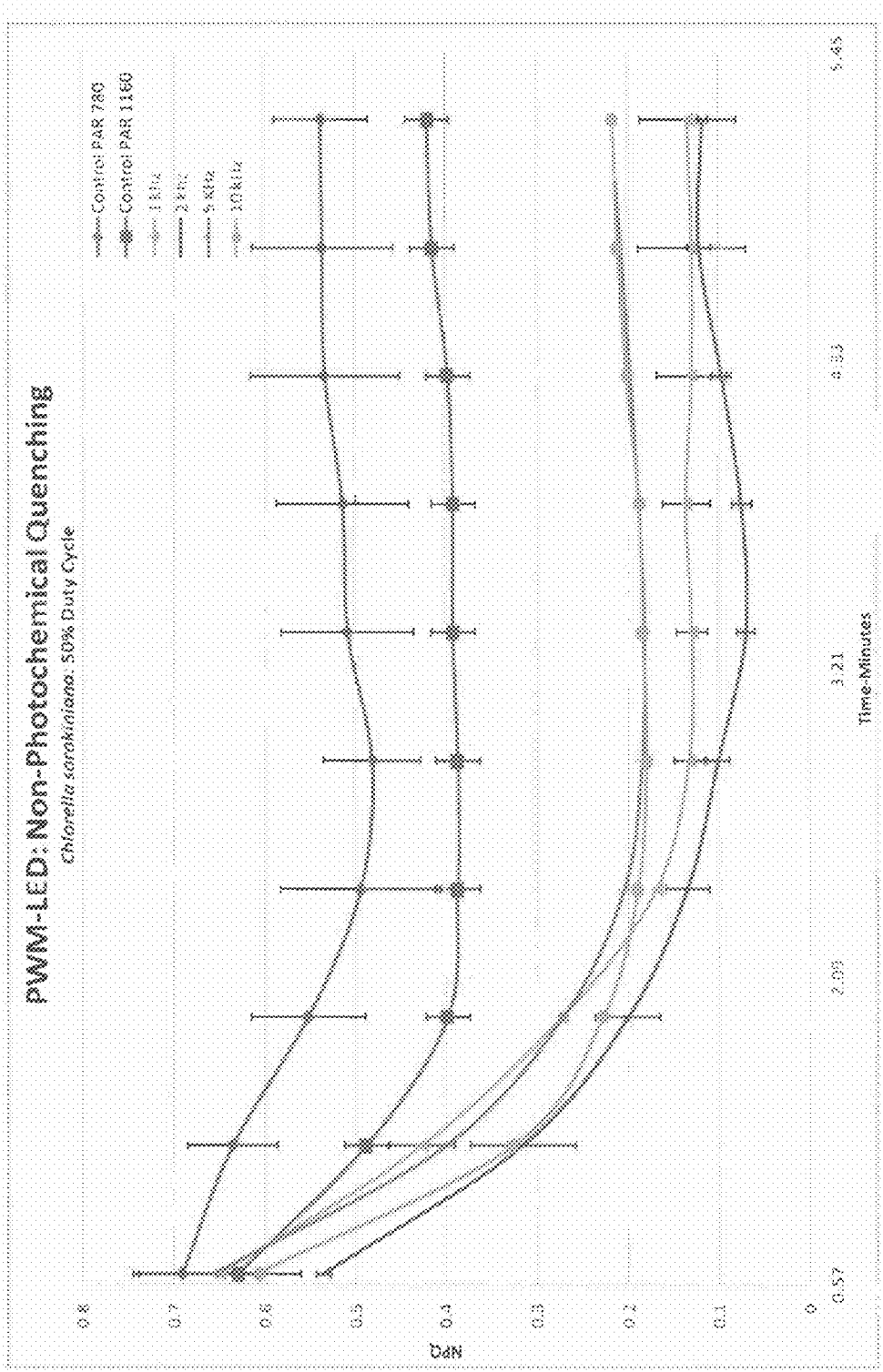
FIG. 9 is a graph that illustrates Non-Photochemical Quenching (NPQ) of *C. sorokiniana*.

*C. sorokiniana* was used as the experimental organism. The culture was dark adapted for one hour. The results observed from the induction curve are furnished in FIGS. 7, 8, and 9. FIG. 7 shows the chlorophyll a fluorescence measurements for quantum yield or effective photosynthetic efficiency under 455 nm pulsed actinic illumination compared to the white halogen light controls providing entire visible range spectrum of 780 and 1160 μmoles/m$^2$/s. *Chlorella sorokiniana* was used at a culture density of approximately 0.2 g/L. The treatment of 2 kHz demonstrated substantially higher yield values than the controls, as well as a small but significant increase over both higher (5, 10 kHz) and lower frequency (1 kHz) illumination.

The photochemical quenching of the treatment with 2 kHz frequency in FIG. 7 shows a dramatic increase in the energy undergoing photoconversion in PSII heading towards carbon fixation compared to the control and other treatments using frequencies 1, 5 and 10 kHz.

Figure 10:
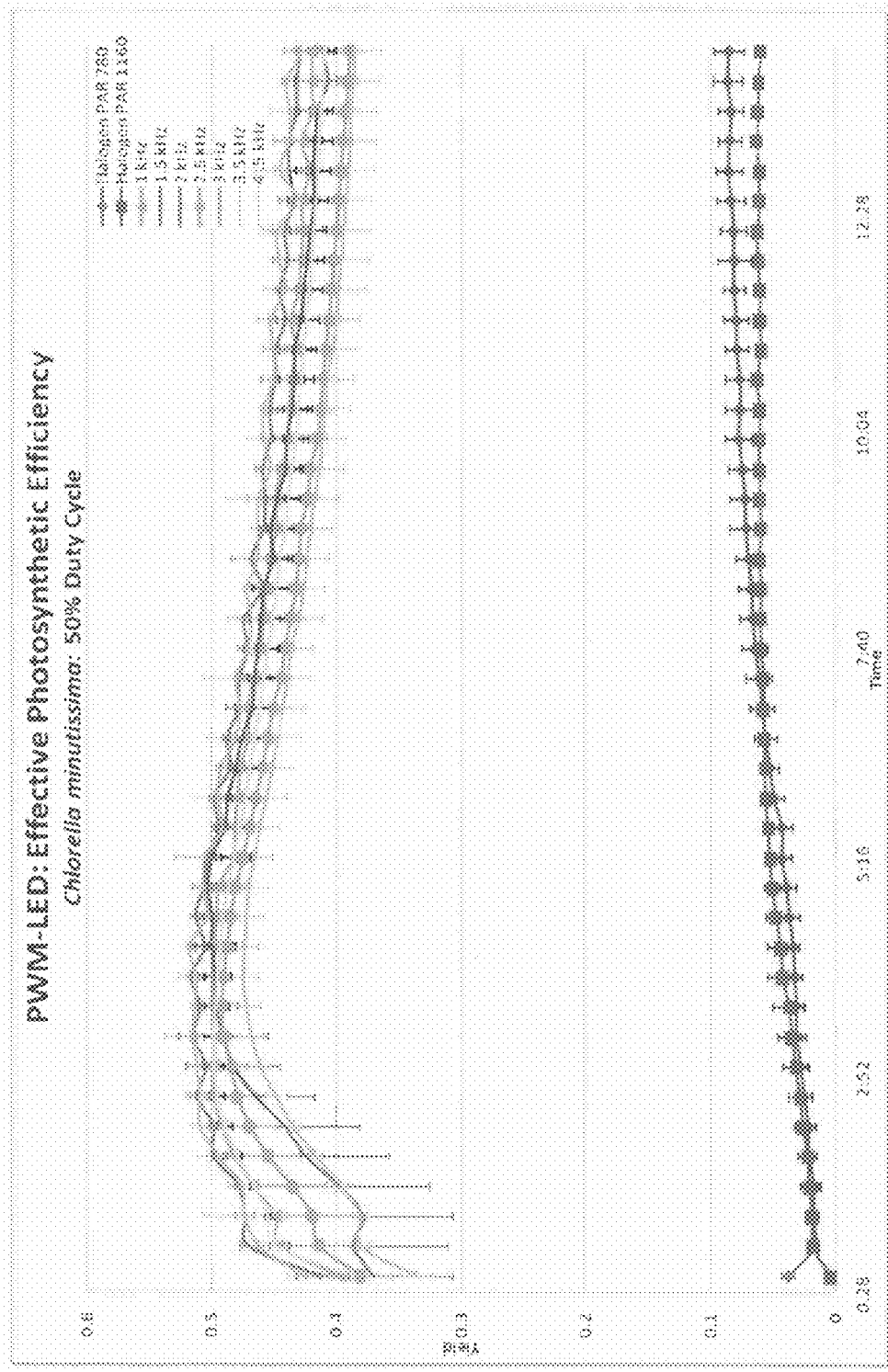
FIG. 10 is a graph that illustrates Effective Photosynthetic Efficiency (Yield) of *C. minutissima*.

FIG. 10 shows results from the first experimental run. The control halogen values demonstrated elevated NPQ values, while all of the pulsed actinic treatments had a substantially reduced NPQ or amount of heat dissipated as losses. Most notable is that the 2 kHz treatment had the largest reduction in wasted energy in accordance with the prediction of between 1-5 kHz as being optimal based on reaction kinetics. The 2 kHz was pulsed at 50% and thus allows 2 ms$^{-1}$ dark period for the OEC and plastoquinone dynamics.

Experimental Run: 2
Species: *Chlorella minutissima*
Pulse Frequency:
  1 kHz
  1.5 kHz
  2.5 kHz
  3 kHz
  3.5 kHz
  4.5 kHz
Control PAR: Halogen-780, 1160 μmoles/m$^2$/s
Dark adapted for 1 hour
Light Induction Curve for 15:00 minutes

*Chlorella minutissima* was the model algae used in the next two sets of experiments. The run was conducted for a 15 minute induction curve as opposed to 5 minutes to invesigate the steady state of quenching parameters. This culture was denser (1 g/L) than run 1 with *C. sorokiniana*. FIG. 10 demonstrates that even more dramatic increases in photosynethetic efficiency were measured with this treatment. Although a small difference, the 2 and 3 kHz treatments at 50% duty cycle were marginally more efficient.

Figure 11:
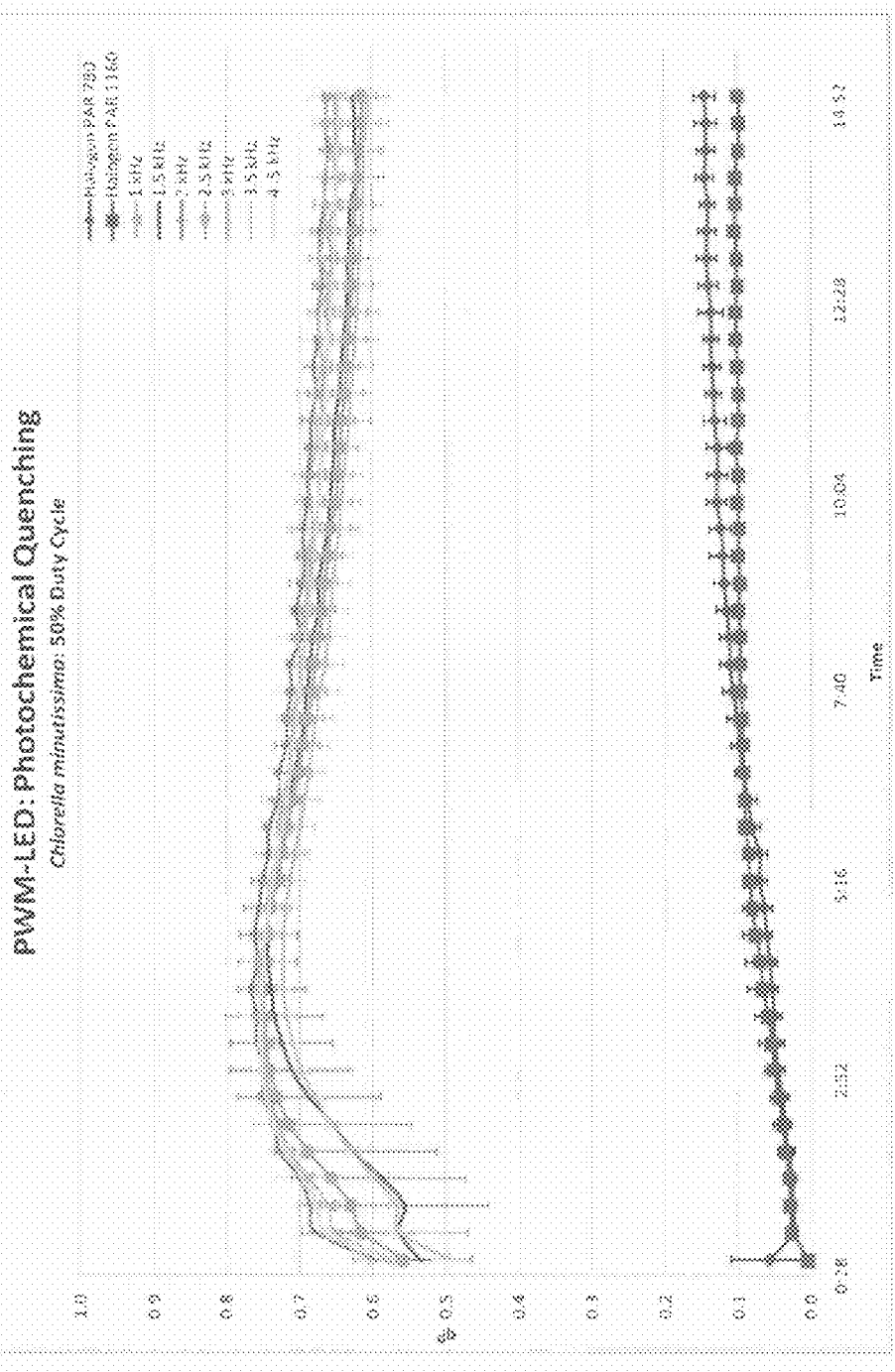
FIG. 11 is a graph that illustrates Photochemical Quenching (qP) of *C. minutissima*.

The results from FIG. 11 look almost identical to the yield data, demonstrating again a substantial increase in the amount of chlorophyll excitations being able to be absorbed by the P680 reaction center and sent towards PSI and carbon fixation in the treatments employing 2 and 3 kHz followed by 1, 4.5, 1.5, 2.5 and 3.5 kHz frequencies.

Figure 12:
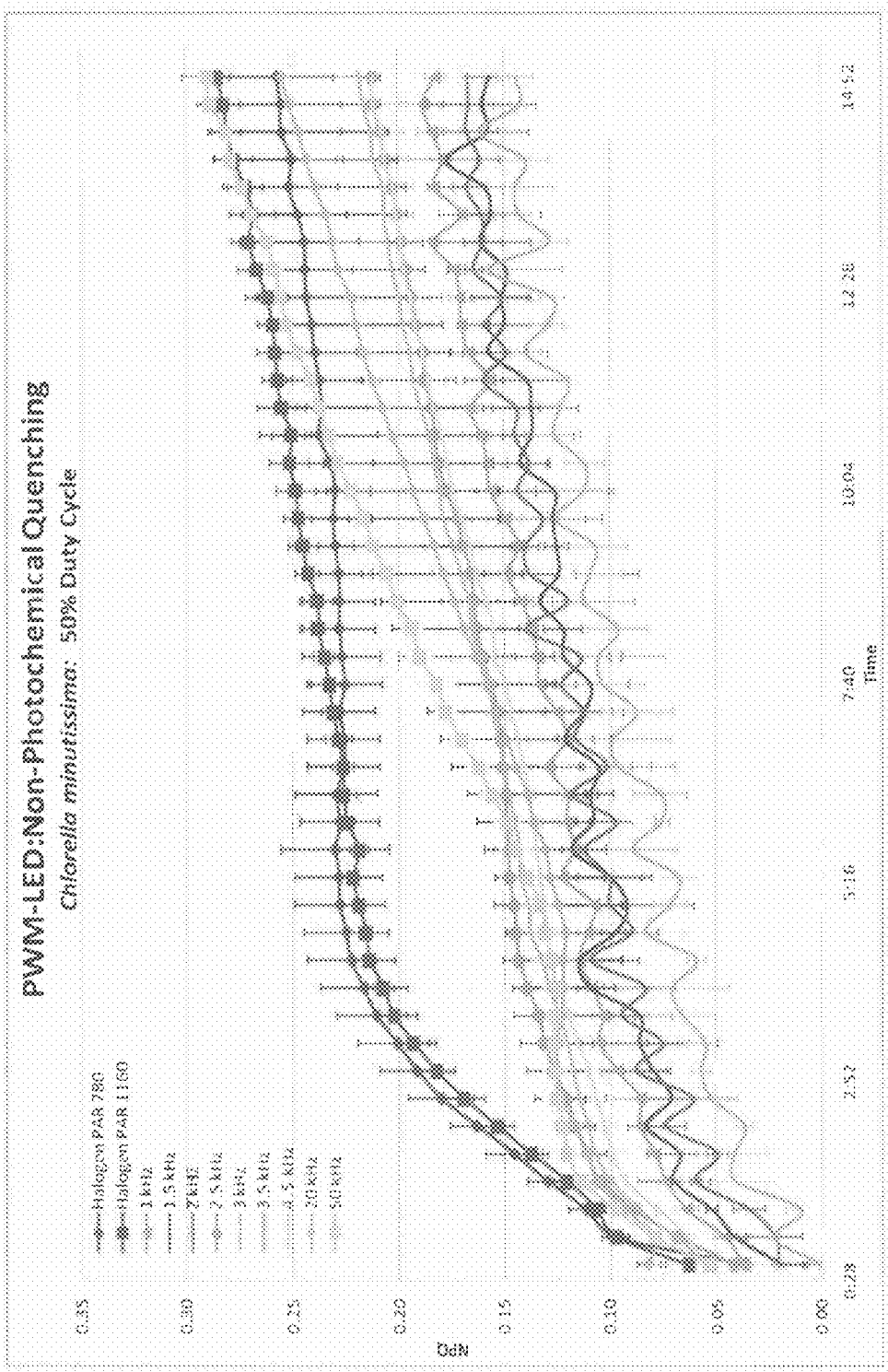
FIG. 12 is a graph that illustrates Non-Photochemical Quenching (NPQ) of *C. minutissima*.
Figure 13:
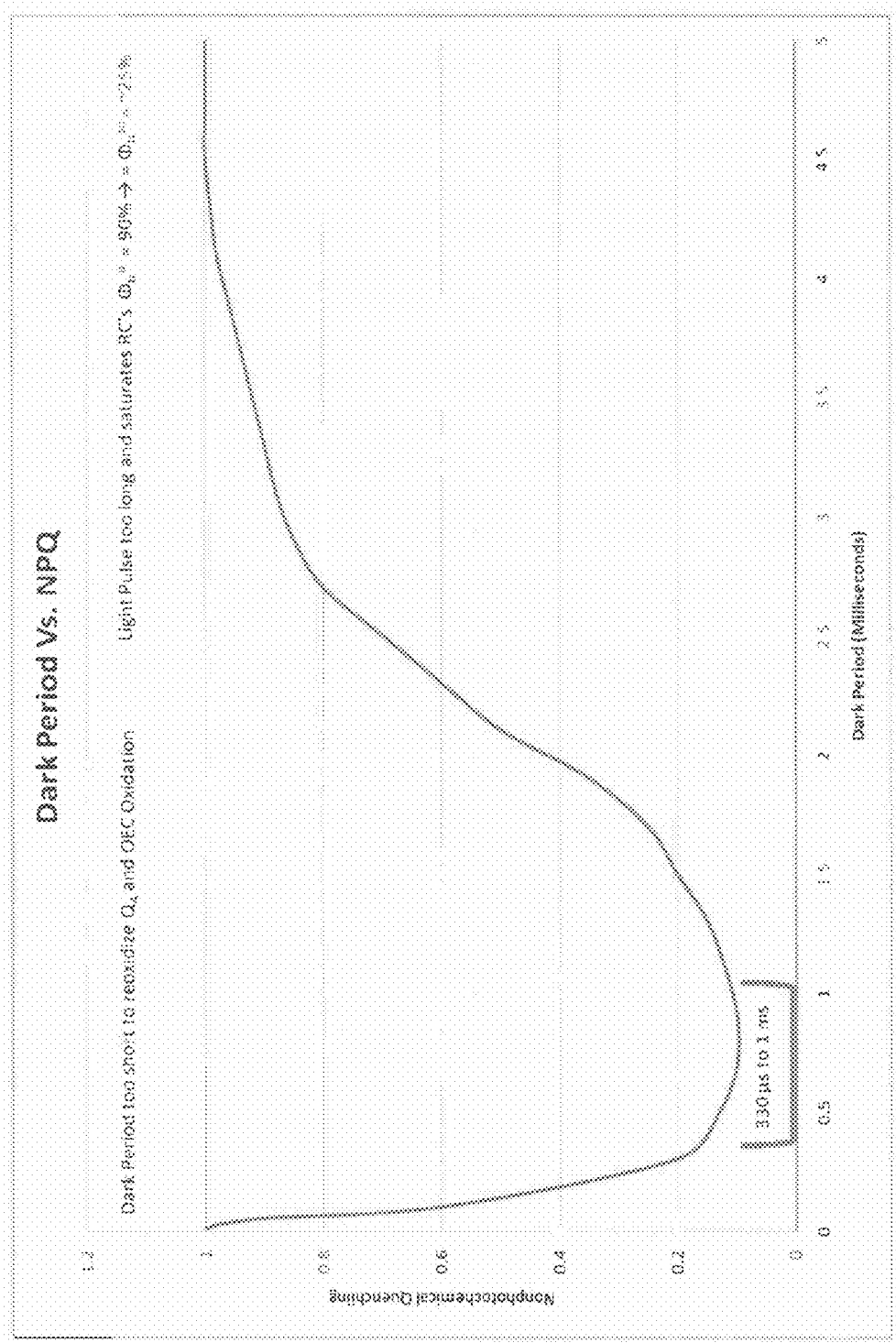
FIG. 13 is a graph that illustrates the theoretical optimal dark period to minimize NPQ.

FIG. 12 is a combination of the NPQ data from two experimental runs, which were performed on the same culture within 24 hours of each other. A dramatic decrease in NPQ and losses was observed for the 1, 1.5, 2 and 3 kHz treatments. Interestingly, the 2.5, 3.5, and 4.5 kHz treatments did not demonstrate the same minimal NPQ, indicating the possibility for some sort of non-linear response. The higher frequency treatments of 20 and 50 kHz, as predicted, demonstrated high NPQ, drifting up with the controls over the 15 minute induction curve. This graph also shows a universal drift of increasing NPQ for all treatments, indicating that the optimal dark periods to minimize qE and excess excitation may vary during illumination. This drift strongly suggests that a feedback system with dynamic self-tuning may provide even more optimal efficiency and NPQ minimization over a fixed frequency pulsed actinic illumination source.

Conclusion

The use of Pulse-Amplitude Modulation Fluorometry to assess the bioenergetic state of the photosynthetic organisms under continuous and modulated illumination demonstrated measurable changes in the fluorescence response of chlorophyll a.

1. It was found that pulsed LED's can dramatically affect the Chlorophyll a fluorescence kinetics leading to decreased NPQ, and enhanced photosynthetic yield and photochemistry.
2. Many of the modulated treatments exhibited similar decreases in excess energy dissipation and increases in photosynthetic capacity probably due to the similarities in the provided dark periods. These dark periods allow the dark reactions of photosynthesis time to process and the reaction centers time to re-oxidize to a fully open state offering maximal capacity for exciton capture and electron transfer efficiency.
3. The PAM's ability to detect small changes in the way energy is transferred through photosystem II demonstrates how this sensitive technique could be used to optimize artificial illumination for cultivation of plants or algae.
4. This study found that the non-photochemical quenching (NPQ) is optimally minimized by a dark period duration no less than 300 μs, then gradually increase above 1 ms.
5. An increase in the effective photosynthetic efficiency (Yield) of approximately >400% and an additional increase in photochemical quenching (qP) ranging from ~200-500% was exhibited by all samples treated with pulsed light than the control using continuous illumination.
6. These results not only confirm the highly beneficial nature of the flashing light effect in terms of chlorophyll reaction kinetics, but also open exciting new applications for optimizing photosynthesis in real-time with a PAM fluorometric monitoring system.

Currently, metal halides or high pressure sodium lighting is used as the light source for photosynthesis in commercial scale agriculture, horticulture and aquaculture cultivation systems. This style of lighting has many inherent problems, especially for growing photosynthetically active organisms. These high powered lamps are driven by a magnetic or electronic ballast to generate the controlled currents and required high voltage. However, the energy losses are substantial due to the heat emitted by the ballasts and bulbs which results in poor efficiency. The light produced from metal halide or high pressure sodium is a full spectrum including green and yellow light which do not directly drive photosynthesis. However, in a LED system, the optimal actinic spectrum can be selected where the organism has maximum absorption, which can be generated and delivered to the light harvesting pigment complexes (LHC's) to increase photosynthetic efficiency. In the case of continuous illumination and high intensity light with full spectrum, a substantial portion of that light will then be dissipated as heat and losses via NPQ. Thus, the metal halide/HPS/mercury vapor lighting system is abound with gross inefficiencies and do not have the capability of Pulse-Width-Modulated (PWM) Light-Emitting-Diode (LED) to optimize the photonic energies for maximum photoconversion.

References

Gordon, J. M., and Polle, J. E. W. (2007). Ultrahigh bio-productivity from algae. Applied Microbiology Biotechnology 76: 969-975.

Holt, N. E., Fleming, G. R., Niyogi, K. K. (2004). Toward an Understanding of the Mechanism of Nonphotochemical Quenching in Green Plants. *Biochemistry* 42(26): 8281-8286

Hu, Q., Zarmi, Y., Richmond, A. (1998). Combined effects of light intensity, light path and culture density on output rate of *Spirulina platensis* (cyanobacteria). European Journal of Phycology 33:165-171.

Katsuda, T., Shimahara, K., Shiraishi, H., Yamagami, K., Ranjbar, R., and Katoh, S. (2006). "Effect of Flashing Light from Blue Light Emitting Diodes on Cell Growth and Astaxanthin Production of *Haematococcus pluvialis*." *Journal of Bioscience and Bioengineering* 102(5): 442-446.

Kim, Z.-H., Kim, S-H., Lee, H-S., Lee, C-G. (2006). "Enhanced production of astaxanthin by flashing light using *Haematococcus pluvialis*." *Enzyme and Microbial Technology* 39: 414-419.

Kok, B. (1953). In: *Algal Culture: From Laboratory to Pilot Plant*. Ed: J. S. Burlew. Carnegie Inst. Washington Publ. 600. Chapter 6: 63-75.

Matthijs, H. C. P., Balke, H., van Hes, U. M., Kroon, B. M. A., Mur, L. R., Binot, R. A. (1995). "Application of light-emitting diodes in bioreactors: Flashing light effects and energy economy in algal culture (*Chlorella pyrenoidosa*)." *Biotechnology and Bioengineering* 50 (1): 98-107.

Mauzerall, D. (1972). Light-Induced fluorescence changes in *Chlorella*, and the primary photoreactions for the production of oxygen. Proceedings of the National Academy of Science, USA 69: 179-189.

Müller, P., Li, X.-P., Niyogi, K. K. (2001). Non-Photochemical Quenching, A Response to Excess Light Energy. *Plant Physiology* 125: 1558-1566.

Park, K.-H., and Lee, C-G. (2000). "Optimization of Algal Photobioreactors using Flashing Lights." *Biotechnol. Bioprocess Eng.* 5: 186-190.

Phillips, J. N. and Meyers, J. (1954). Growth Rate of *Chlorella* in Flashing Light. *Plant Physiology* 29(2): 152-161.

Richmond, A., Zhang, C. W., Zarmi, Y. (2003). Efficient use of strong light for high photosynthetic productivity: inter-relationships between the optical path, the optimal population density and cell-growth inhibition. Biomolecular Engineering 20:229-236.

Terry, K. L. (1986). Photosynthesis in modulated light: quantitative dependence of photosynthetic enhancement on flashing light rate. *Biotechnology and Bioengineering* 28: 988-995.

Vrenenberg, W. J. (2004). System Analysis and Photochemical Control of Chlorophyll Fluorescence in Terms of Trapping Models of Photosystem II: A Challenging View. George C. Papageorgiou and Govindjee (eds): Chlorophyll a Fluorescence: A Signature of Photosynthesis, Springer, pp. 133-172.

Wijn, R. d. and Gorkom, H. J. v. (2001). Kinetics of Electron Transfer from $Q_A$ to $Q_B$ in Photosystem II. *Biochemistry* 40: 11912-11922.

Example 2

Abstract

The experimental results of the microalgae, *Chlorella sorokiniana*, chlorophyll a fluorescence analysis on three different growth stages identified at its Optical Density (OD) at wavelength 735 nm OD: 0.5, 1.0 and 1.5. The cultures were irradiated with 6 monochromatic Light Emitting Diodes (LED) and three full light spectrum white LEDs (neutral white, cool white and warm white). The chlorophyll fluorescence parameters of quantum yield of Photosystem II ($\phi_{PSII}$) and Non-photochemical quenching (NPQ) were measured for each sample. Absorbance spectra curves were scanned using *C. sorokiniana* in vivo at the three establish ODs. An inverted correlation between $\phi_{PSII}$ and light intensity was found based on light absorption of *C. sorokiniana* pigment content, which is rich in the pigment lutein. Due to changes in absorption at various wavelengths, *C. sorokiniana* exhibited a lower $\phi_{PSII}$ in the green spectrum over the red spectrum of light as the culture increased in OD. NPQ had a noticeable decrease as the culture moved from OD 0.5 to 1.0 due individual cell's exposure to lower photosynthetic photon flux density (PPFD).

Introduction

Microalgae cultivation for biofuels has been praised as a promising feedstock for conversion into liquid transportation fuels. However, the petroleum industry exhibits competitive pricing and market fluctuations, which make it hard for potential microalgae producers to compete for low-value transportation fuels. Traditionally, the cultivation of microalgae has been reserved for use as a high protein "green food" supplement as well as a feedstock for high value bioactive compounds and nutrients. These high value bioproducts obtained from various species of microalgae and cyanobacteria can offer much higher market value at much lower quantities than biofuels (1). The development of methods to induce higher biomass production is of paramount importance for microalgae cultivation for biotechnology and bioactive compounds. Despite higher capital costs, photobioreactors (PBR) are the best way to achieve higher biomass production and maintaining monoculture by being able to specifically control various environmental parameters. The higher costs associated with PBR's and artificial illumination can only be warranted by high value products and high growth productivity. There are a several designs for PBR's which attempt to optimize mass transfer, light exposure, and environmental control of the culture (2). Even in these optimized systems, the irradiance onto the cells is still one of the major limiting factors. As the culture achieves high density population, the light penetration substantially decreases due to physical shading and physiological factors described here.

Incident radiation with wavelengths of 400-700 nm is generally considered the photosynthetically active component of the total spectral irradiance and is termed Photosynthetically Active Radiation (PAR) (3). All kinds of lamps can provide PAR, however, the energy conversion efficiency from electric energy to visible light energy varies dramatically depending on the light source. Lighting efficiency is measured in light output per watt and represents the amount of light produced for each watt of electricity consumed. Incandescent and halogen lights have the lowest lighting efficiency (10-17 and 12-22 lumens per watt, respectively) whereas linear fluorescent and high pressure sodium have higher efficiency (30-110 and 50-140 lumens per watt, respectively). Although useful for comparison, the light output here is given in the photometric unit, lumens, which give higher values to light spectra with more green. However, plant photosynthesis is driven primarily by blue and red portions of the spectrum, which are not equally represented by a lumen rating.

By providing plants with full spectrum PAR, a portion of the electric energy converted to light is wasted for photochemical conversion in the organism as a consequence of light reflection and/or heat dissipation through biochemical pathways, such as the xanthophyll cycle. The illumination of a culture by specific wavelengths which match the spectral absorbance of the microalgae pigments can avoid these energy losses by achieving a better growth rate/energy consumption ratio. Light Emitting Diodes (LED) can emit light at specific wavelength ranges, thus it is possible to drive photosynthesis by providing only the most effective wavelengths to various microalgae species accordingly to their pigment profile. LED systems can also provide pulsed light where bursts of high irradiance are followed by a short dark period to allow time for the photochemical processes to restore the chlorophyll reaction center. Experiments with pulsed LED's have been able to sustain near maximum growth rates with major gain in energy efficiency while exhibiting lower heat losses compared to fluorescent lighting (4). The advancements in LED technology are now making commercially available LED's with light efficiencies in the range of 80 and recently as high as 200 lumens per watt (5). In addition, the energy converted by LEDs will be emitted as specific wavelengths that can be tuned for photosynthetic absorption thereby decreasing energy wasted from reflection and internal losses under full spectrum light.

The Photosynthetic process begins at light absorption by the chloroplast. Absorbed photons are trapped by chlorophyll and other pigment's antennae complex embedded in the thylakoid membrane of the chloroplasts. Pigments are arranged in three dimensional pigment-protein complexes which determine their function and efficiency of energy transfer. The spectrum of light absorbed is determined by the pigment composition of each specific photosynthetic organism. Each pigment has a specific light absorption capacity, and varies by both the spectrum absorbance as well as its absorption coefficient. The main pigments found in terrestrial plants, microalgae and cyanobacteria are chlorophyll a and b with maximum light absorption peaks in the blue and red spectrum; and carotenoids with light absorption peaks in the blue and yellow spectrum.

The light absorbed by antennae complex has three fundamental fates: it is either used to drive photosynthesis (photochemical quenching—qP); dissipated as heat (Non-photochemical quenching—NPQ); or re-emitted as fluorescence. The energy directed to the reaction centers P680 (RCII) of Photosystem II (PSII) and P700 of Photosystem I (PSI) is used to drive the light reactions. At RCII water molecules are split releasing electrons to the electron transport chain. Those electrons are conducted through a series of acceptors to PSI where it is excited again and used to produce the reductant molecule NADPH in a process named 'Z'-scheme first described by Hill and Bendall (6). During this process, $H^+$ protons released from the splitting of water plus $H^+$ protons pumped across the lumen membrane accumulate inside the lumen creating a proton gradient which drives ATP synthesis. Protons escaping from the thylakoid lumen through a central core of the enzyme ATP synthase cause conformational changes in the enzyme which catalyzes the phosphorylation of ADP producing ATP on the stromal side (7). Both ATP and NADPH molecules are further used to reduce $CO_2$ molecules to hexose in the Calvin-Benson Cycle (dark reactions). The dark reactions are slower than light reactions, so under high light conditions the electron flow is saturated and the electrons transported on light reactions can be accepted by other molecules rather than $NADP^+$ (e.g., $O_2$) producing free radicals. These highly reactive molecules can cause photodamage and photo-oxidation to the photosynthetic apparatus mechanism causing reversible photoinactivation or in severe conditions permanent inactivation of PSII reaction centers, known as photoinhibition (8).

Microalgae, as all the other higher plants, have protective mechanisms that dissipate the excess of absorbed light energy as heat (NPQ). The most effective and fastest NPQ mechanism is termed high energy state quenching (qE). This process is induced by the pH decreasing in the lumen and causes the protonation of PSII proteins activating the xanthophyll synthesis within the carotenoids pigments via xanthophyll cycle. At low lumen pH, the enzyme violaxanthin de-epoxidase removes two epoxides groups from the violaxanthin transforming this pigment into a zeaxanthin. The interaction of zeaxanthin with chlorophyll dissipates excitation energy as heat rather than transferring it to chlorophyll molecules.

Fluorescence is the re-emission of energy in the form of a photon as an electron returns to ground state from a singlet excited state. As some energy is also given off as heat, the photon is red-shifted with an emission peak of ~685 nm (3). At room temperature nearly all fluorescence (90-95%) comes from PSII at 685 nm. Fluorescence emitted by PSI is very low at normal temperatures and only can be detected at the temperature of liquid nitrogen. Indeed, the primary acceptor of electrons from P700 is rapidly re-oxidized, reducing fluorescence emissions at PSI (9).

The maximum rate of photosynthesis is independent of wavelength (10), however, it is important to find the maximum light intensity that provides maximum biomass production at each specific wavelength without producing damage-reactive species (e.g., $^1O_2$*) as byproducts of photosynthesis (11). Finding the best LED wavelengths at optimal intensities will optimize photochemical conversion instead of NPQ.

Fluorescence can be used to estimate the quantum efficiency of charge separation at RCII (12). The use of fluorescence measurements as a probe of photosynthetic productivity have been vastly investigated due to the simplicity of the measurements. Many studies correlating photosynthetic carbon fixation and electron transport rate based on changes in fluorescence yield have been reported (13) (14) (15). However, the underlying theory and the interpretation of data remains complex.

In the present disclosure, fluorescence re-emissions were monitored using a PAM flourometer from the microalgae *C. sorokiniana* at different growth stages to analyze how the proportion of light absorbed by pigments associated with PSII used to drive photosynthesis (quantum yield of Photosystem II—$\phi_{PSII}$) and dissipated as heat (NPQ) are affected by six different monochromatic LED's and three different temperature rated white LED's compared at three different light intensities and three culture densities.

Materials and Methods

Algal Culture

*Chlorella sorokiniana* (UTEX 2805) was obtained from UTEX Culture Collections and maintained in BG11 medium ($NaNO_3$, 17.6 mM; $K_2HPO_4$, 0.22 mM; $MgSO_4.7H_2O$, 0.03 mM; $CaCl_2.2H_2O$, 0.2 mM; citric acid.$H_2O$, 0.03 mM; ammonium ferric citrate, 0.02 mM; $Na_2EDTA.2H_2O$, 0.002 mM; $Na_2CO_3$, 0.18 mM; $H_3BO_3$, 46 μM; $MnCl_2.4H_2O$, 9 μM; $ZnSO_4.7H_2O$, 0.77 μM; $Na_2MoO_4.2H_2O$, 1.6 μM; $CuSO_4.5H_2O$, 0.3 μM; $Co(NO_3)_2.6H_2O$, 0.17 μM). The pH value of culture medium was adjusted to 7.0±0.2 before inoculation and the algae were maintained in a temperature controlled illuminated growth chamber at 25±1° C. and 100±10 μmoles/$m^2$/s light intensity provided by cool white fluorescent (6500K) T-8 bulbs.

Samples Growth

The microalgae cultures were grown in BG11 nutrient media. For the preparation of the mother culture, two flasks were filled with 270 mL of BG11 media and inoculated with 30 mL's of *C. sorokiniana* (10% by volume) in exponential phase. The flasks were placed into a temperature controlled illuminated growth chamber. Samples from both flasks were taken daily for optical density measurements at 750 nm. The samples were grown to three specific optical densities, i.e., $OD_{750}$: 0.5, 1.0, 1.5. Once the samples reached the desired density, the culture was removed from the growth chamber and was then used in the LED-PAM experiments.

Optical System

Two LED panels were built using aluminum heat sinks. The first LED panel contains five Luxeon® III Star LED's: red ($\lambda_{627\ nm}$), red-orange ($\lambda_{617\ nm}$), amber ($\lambda_{590\ nm}$), green ($\lambda_{530\ nm}$), cyan ($\lambda_{505\ nm}$) and one Luxeon® K2 Emitter LED: blue ($\lambda_{470\ nm}$). The second panel contains three Luxeon® K2 Emitter LED with temperature ratings of neutral white (5000K), cool white (6500K) and warm white (2700K). Each LED was used to illuminate the microalgae samples through a ¼ inch diameter fiber-optic light guide positioned 1 mm away from the surface of the 10 mm path-length cuvette. A light condenser was attached from the flat end of the fiber optic cable to the LED to collect and direct the LED output through the light guide. Each LED was driven by a single Luxdrive™ 1000 mA Buckpuck 3021-D-E-1000. The Buckpuck driver was powered by an Agilent power supply (Agilent Technologies, Santa Clara, Calif., USA) which enables voltage and current regulation to adjust light intensity output. Radiometric light intensity measurements were performed at tip of the fiber optic light guide and reported in μmol $m^{-2}$ $s^{-1}$ using a quantum sensor (LI-COR, Quantum Sensor LI-190, and Datalogger, LI-1400 Lincoln, Nebr., USA).

Analytical Methods

Absorbance spectrum from 400-800 nm was measured, and the culture optical density was recorded at 750 nm using a Varian Cary 50 UV/Visible spectrophotometer (Varian, Inc, Santa Clara, Calif., USA). The chlorophyll a fluorescence parameters, quantum yield of Photosystem II ($\phi_{PSII}$) and non-photochemical quenching (NPQ), were determined by a Pulse Amplitude Modulation (PAM) fluorometer Walz Mini-PAM (Heinz Walz GmbH, Effeltrich, Germany). The microalgae samples were analyzed inside a 5.0 mL cuvette with 10 mm path-length. Two fiber optic light guides were positioned on the surface of the cuvette at right angles. One light guide was connected to the LED panel for illumination and the second light guide was connected to the Mini-PAM Fluorometer for fluorescence measurements. The cuvette and light guides were contained inside a hinged-top dark enclosure (12.5 cm×15.5 cm×16.5 cm) custom made out of delrin plastic.

Experimental Procedure

Samples at three different optical densities were each illuminated by one of the nine LED's at three different light intensities (100, 250 and 500 μmol $m^{-2}$ $s^{-1}$), for 5 minutes while Chlorophyll a fluorescence was continuously monitored. All treatments were carried out in duplicates.

In order to record maximum fluorescence yield, samples were dark adapted for 30 minutes prior to fluorescence analysis to allow total NPQ relaxation and fully oxidize QA. 3 mL aliquots were placed at the cuvette for each run, following the process described by Maxwell and Johnson (16) both $\phi_{PSII}$ (Eq. 1) and NPQ (Eq. 2) were recorded. The saturating light pulses from the PAM's internal halogen bulb had a duration of 1.5 seconds at 10,000 μmol $m^{-2}$ $s^{-1}$, and were used to produce a transient closure of the PSII photochemical reaction center every 20 seconds for a 5 minutes run:

$$\phi_{PSII} = (F'_m - F_t)/F'_m \qquad \text{Eq. 1}$$

$$NPQ = (F^\circ_m - F'_m)/F'_m \qquad \text{Eq. 2}$$

where $F'_m$ is the fluorescence maximum in the light; $F_t$ is the steady state value of fluorescence immediately prior to the flash and $F^\circ_m$ is the maximum fluorescence value in dark-adapted state, obtained by simultaneously exhibition to the actinic (LED) and the saturating light.

The treatments were defined by a LED color, light intensity and culture density. Each treatment had a fresh 3 ml of algal culture injected into the sample cuvette and the $\phi_{PSII}$ and NPQ measurements were taken for 5 minutes to produce the induction curve. An average of the last three measurements of $\phi_{PSII}$ and NPQ were taken as the final equilibrium values for each treatment. The final results reported in the tables were calculated from the average of duplicate runs per treatment. Statistical analysis was performed using SAS 9.2. The $\phi_{PSII}$ data was analyzed as a Factorial Design within each ODs and NPQ was analyzed as a Factorial Design within each LED color.

Results

Quantum Yield

Among the three white LEDs (neutral white, cool white and warm white), the neutral white LED always exhibited the best $\phi_{PSII}$ ($p<0.05$). To facilitate the visualization of the data for full spectrum white light, the results from the three white LED's are reported together. In general, as the light intensity increases, a decrease in $\phi_{PSII}$ values was observed for all monochromatic wavelengths and the full spectrum white LED (Table.1). Orderly interaction was observed between the factors of light intensity and color at an OD of 1.0 and 1.5. Despite difference in the magnitude between levels of light intensity change from monochromatic wavelengths and white LED, the order of means for levels of light intensity is always the same. Thus, the main effects of wavelength and light intensity are meaningful.

At the low density culture (OD 0.5) $\lambda_{470\ nm}$ had lower $\phi_{PSII}$ and $\lambda_{505\ nm}$ had higher $\phi_{PSII}$ compared to the control white LED whereas all the other wavelengths showed no significant difference. At the medium density (OD 1.0) $\lambda_{470\ nm}$ and $\lambda_{617\ nm}$ had lower $\phi_{PSII}$ compared to control white LED which had no significant difference to $\lambda_{627\ nm}$. All the other wavelengths had a higher $\phi_{PSII}$ compared to control white LED. At higher culture density (OD 1.5) $\lambda_{470\ nm}$ and control white LED showed the lower $\phi_{PSII}$ with no significant difference, whereas all the other wavelengths had higher $\phi_{PSII}$.

Within the monochromatic wavelengths, $\lambda_{530\ nm}$ and $\lambda_{505\ nm}$ exhibited higher $\phi_{PSII}$ on samples with OD 0.5, whereas on samples with OD 1.0 showed a gradual drop in $\phi_{PSII}$ switching position with $\lambda_{590\ nm}$, $\lambda_{617\ nm}$ and $\lambda_{627\ nm}$ on samples with OD 1.5. At the red spectrum ($\lambda_{617\ nm}$; $\lambda_{627\ nm}$), $\phi_{PSII}$ does not drop as the samples OD increase from 1.0 to 1.5 in any of the 3 light intensities (shaded area on Table.1). For $\lambda_{590\ nm}$ the variation in $\phi_{PSII}$ as OD increases from 1.0 to 1.5 is very small.

TABLE 1

| | | λ (nm) | | | | | | |
|---|---|---|---|---|---|---|---|---|
| | | 470 | 505 | 530 | 590 | 617 | 627 | White |
| | | $\Phi_{PSII}$ | | | | | | |
| OD | Light intensity ($\mu$mol m$^{-2}$ s$^{-1}$) | | | | | | | |
| 0.5 | 100 | 0.4387 | 0.6388 | 0.5575 | 0.5485 | 0.4910 | 0.5357 | 0.5492 |
| | 250 | 0.3700 | 0.6378 | 0.5428 | 0.4513 | 0.4592 | 0.4763 | 0.4815 |
| | 500 | 0.3255 | 0.5352 | 0.4995 | 0.4398 | 0.3612 | 0.4452 | 0.4433 |
| 1 | 100 | 0.3208 | 0.3770 | 0.3983 | 0.3540 | 0.2981 | 0.3080 | 0.3700 |
| | 250 | 0.2340 | 0.3012 | 0.3590 | 0.2853 | 0.2477 | 0.2476 | 0.2940 |
| | 500 | 0.1365 | 0.2286 | 0.3136 | 0.2198 | 0.1643 | 0.1966 | 0.2041 |
| 1.5 | 100 | 0.1995 | 0.2252 | 0.2495 | 0.3055 | 0.3028 | 0.3202 | 0.2097 |
| | 250 | 0.1402 | 0.1718 | 0.2228 | 0.2568 | 0.2445 | 0.2717 | 0.1587 |
| | 500 | 0.0793 | 0.1345 | 0.1893 | 0.2102 | 0.1585 | 0.2183 | 0.1150 |

Significant Effects (P < 0.001)

| OD | Light intensity | color | Light intensity × color |
|---|---|---|---|
| 0.5 | 25.37 | 29.38 | n.s. |
| 1.0 | 838.48 | 174.44 | 11.96* |
| 1.5 | 428.44 | 234.43 | 8.98* |

Results for Quantum yield of Photosystem II ($\Phi_{PSII}$) of *C. sorokiniana* at three Optical Densities (OD) under interactive Wavelength (λ) and Light intensity.
*refers to orderly interaction.
Shaded part indicates the constant $\Phi_{PSII}$ values.

Non-Photochemical Quenching

Non-Photochemical Quenching (NPQ) refers to the difference between the initial, dark-adapted maximum level of fluorescence and that recorded after a period of illumination (17). Although NPQ does not show any logical behavior when analyzed within each OD either as a light intensity or wavelength response (model p-value >0.05), a relation was found when it was analyzed within wavelengths as culture OD response (Table 2). As the culture increased its OD from 0.5 to 1.0 NPQ had a significant decrease at all monochromatic wavelengths and the control white LED. At $\lambda_{470\,nm}$ an interaction between the factors: light intensity and OD, was observed. Using T comparison lines for least square means of the interaction OD*light intensity we identified the same significant drop in NPQ from OD 0.5 to 1.0 (shaded area Table 2).

TABLE 2

| | | λ (nm) | | | | | | |
|---|---|---|---|---|---|---|---|---|
| | | 470 | 505 | 530 | 590 | 617 | 627 | White |
| | | NPQ | | | | | | |
| OD | Light intensity ($\mu$mol m$^{-2}$ s$^{-1}$) | | | | | | | |
| 0.5 | 100 | 0.2393 | 0.2490 | 0.1932 | 0.3463 | 0.1853 | 0.2383 | 0.1685 |
| | 250 | 0.2935 | 0.1992 | 0.2103 | 0.2388 | 0.1663 | 0.2220 | 0.2033 |
| | 500 | 0.3858 | 0.3102 | 0.1672 | 0.2380 | 0.2412 | 0.1842 | 0.1890 |
| 1 | 100 | 0.0703 | 0.0360 | 0.0633 | 0.0477 | 0.1342 | 0.1435 | 0.0580 |
| | 250 | 0.1432 | 0.0605 | 0.0715 | 0.0772 | 0.1645 | 0.1480 | 0.0983 |
| | 500 | 0.1078 | 0.1363 | 0.0950 | 0.1315 | 0.1732 | 0.1113 | 0.1432 |
| 1.5 | 100 | 0.0932 | 0.0692 | 0.0638 | 0.0990 | 0.0447 | 0.0893 | 0.1103 |
| | 250 | 0.0923 | 0.0705 | 0.0757 | 0.0847 | 0.0430 | 0.0810 | 0.1133 |
| | 500 | 0.0863 | 0.0950 | 0.0685 | 0.0715 | 0.1432 | 0.0723 | 0.1260 |
| Significant Effects | | | | | | | | |
| OD | | 108.34*** | 31.8*** | 50.37*** | 13.5** | 26.87*** | 26.36*** | 15.53** |
| Light intensity | | 6.95* | 4.64* | n.s. | n.s. | 9.39** | n.s. | n.s. |
| Light intensity* OD | | 5.08* | n.s. | n.s. | n.s. | n.s. | n.s. | n.s. |

General Linear Model for Non-photochemical quenching (NPQ) of *C. sorokiniana* at six monochromatic wavelengths (λ) and full spectrum white LEDs under interactive Optical Densities (OD) and Light Intensity.
*refers to significance at P < 0.05;
**to significance at P < 0.01;
***to significance at P < 0.001.
Shaded part indicates the significant different NPQ values.

Light Absorption Spectra Curves

Figures 14A, 14B:
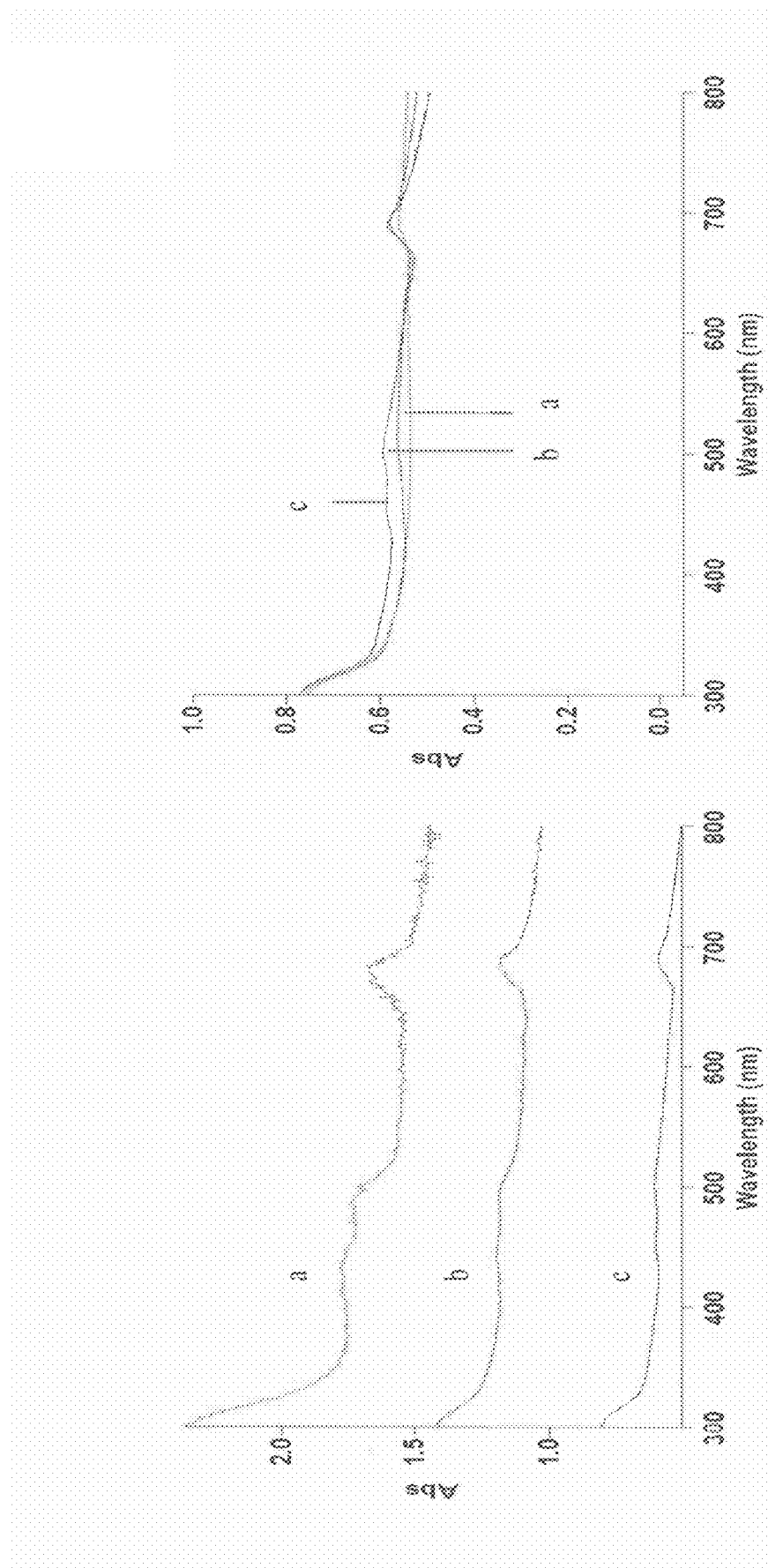
FIG. 14A is a graph that illustrates visible light absorbance of *Chlorella sorokiniana* at three OD's: 0.5 (a), 1.0 (b), and 1.5 (c).
FIG. 14B is a graph that illustrates visible light absorbance of different age *Chlorella sorokiniana* 7 days (a), 15 days (b), and 30 days (c) diluted to the same OD 0.55.

Measurements of light spectrum absorbance were taken on C. sorokiniana samples at OD 0.5, 1.0 and 1.5. All wavelengths demonstrated higher absorption at denser cultures (FIG. 14A). Apart from variations in amplitude, wavelengths that overlap the absorbance spectrum of carotenoids and chlorophyll ($\lambda_{470\ nm}$ and $\lambda_{505\ nm}$) showed constant higher absorbance than the other wavelengths. A valley between 550 nm and 650 nm and a peak at 680 nm can be observed (FIG. 14A). The older samples at OD 1.5 (30 days) and OD 1.0 (15 days) diluted to OD 0.5 were scanned and compared to the youngest sample at OD 0.5 (7 days). The older samples showed less absorption within PAR spectrum than the young sample (FIG. 14B).

Discussion

To increase the energy efficiency of cultivating microalgae and other greenhouse cultures using artificial supplemental lighting, many studies have been conducted to find the best wavelengths, intensities and frequencies of light that can induce the maximum photochemistry with minimum NPQ. Low light intensities illumination may not induce the necessary photochemistry to maximize biomass production. Whereas high light intensities may sufficiently drive photochemistry but can result in both wasted energy as heat and photodamage of chloroplast (8).

Microalgal biomass yields higher than 100 g dry weight $m^{-2}\ d^{-1}$ are projected under optimal conditions, which can only be provided using LED's due their temporal, spectral and intensity characteristics (18), related to the balance of the rates at which the photosynthetic electron flow from PSII reduces $Q_A$ and the efflux toward PSI which oxidizes $Q_A$ (4).

As the microalgae cultures in ponds increase in density, light penetration becomes a major issue to sustain high growth productivities. Without being bound by any particular theory, we suspect that wavelengths with lower absorption by the primary pigments (chlorophyll, carotenoids, etc), can penetrate deeper into dense cultures and offer better light distribution in the pond. Colors such as green, which exhibit a high reflection coefficient, can homogenously distribute light energy at deeper levels where the other more strongly absorbed wavelengths, such as blue and red, become filtered out.

Light Absorption

Chlorella sorokiniana is rich in carotenoid pigments (0.69% of dry matter) that can absorb light in the blue and green spectrum of PAR (400 nm to 530 nm). Lutein is the primary carotenoid pigment found in C. sorokiniana representing 60% of the total carotenoids (19) (Table 3).

TABLE 3

C. sorokiniana carotenoid pigments content and its maximum absorbance wavelength corrected for acetone ($\lambda_{ad}$).

| Compound | [a]Content (µg g$^{-1}$ dry weight) | [b]$\lambda_{ad}$[nm] |
| --- | --- | --- |
| Carotene | 600 | 452 |
| Cryptoxanthin | 36 | 452 |
| Lutein | 4300 | 448 |
| Zeaxanthin | 140 | 452 |
| Total Carotenoids | 6900 | |

[a]taken from Matsukawa et al (2000);
[b]taken from Biehler et al (2010)

β-carotene (not listed in Table 3), also called the red-protein, is another carotenoid pigment present on C. sorokiniana. It is present at 600 µg g$^{-1}$ dry weight (19) and was reported to have peak absorption spectrum at 538 nm on spinach lamellae (20) and parsley leaves (21). In freeze-dried chloroplasts from wheat leaves β-carotene and Lutein showed peak absorptions at 510 nm and 495 nm (22). Specific absorption coefficients of 2144 and 403.3 (100 mL g-1 cm-1) at $\lambda_{472\ nm}$ and $\lambda_{508\ nm}$ respectively were found for the yellow isochromic fraction (β-carotene, β-cryptoxanthin and zeaxanthin) of paprika and red pepper oleoresins carotenoids (in acetone) (23).

Total carotenoids in the batch cultivation of microalgae follow the same pattern as the biomass productivity, showing growth at an exponential rate and reaching the steady state along with cell biomass. However, the carotenoid content measured in the individual cells decreases with time (24). The same pattern is observed for chlorophyll a and b pigments in batch cultures growth. Different age samples diluted to the same OD showed differential absorption at PAR spectrum of light indicating less pigments in older individual cells than younger cells (FIG. 14B).

Total extracted pigment curves containing chlorophyll a and b and carotenoids present high absorbance at the blue and red spectrum. The higher absorbance in the blue spectrum is attributed to an overlap in primary chlorophylls and carotenoid absorption peaks. Although the two red spectrum LEDs $\lambda_{617\ nm}$ and $\lambda_{627\ nm}$ are absorbed exclusively by chlorophyll present in C. sorokiniana these two wavelengths fall out of chlorophyll a and b main absorbance peak at $\lambda_{680\ nm}$ and $\lambda_{660\ nm}$ (25). Despite the higher number of cells in samples at OD1.5 compared to samples at OD1.0, no change in $\phi_{PSII}$ was observed under any of the three light intensities at these two wavelengths ($\lambda_{617\ nm}$ and $\lambda_{627\ nm}$).

Yield

Changes in fluorescence parameters analyzed here ($\phi_{PSII}$ and NPQ) should not be attributed to photodamage of the photosynthetic apparatus. The light intensities used in this work were not high enough to saturate the electron flow. Wang, et al. (26) tested the effects of different LEDs on Spirulina platensis found that biomass production increases with increasing intensities from 300 to 3000 µmol $m^{-2}\ s^{-1}$ using monochromatic $\lambda_{627\ nm}$, $\lambda_{470\ nm}$ and $\lambda_{530\ nm}$ and full spectrum white LEDs.

In this research, we found an inverse correlation between light intensity and $\phi_{PSII}$. The overall decrease in $\phi_{PSII}$ is associated to more efficient use of energy at low irradiations. Second Sugget et al. (12), $\phi_{PSII}$ here defined can be decomposed into:

$$\phi_{PSII}' = \phi_P' \times \phi_{NPQ}'$$

These measurements are taken under actinic light illumination, indicated by the apostrophe. $\phi_P'$ estimates the efficiency of charge separation in RCII and $\phi_{NPQ}'$ is defined as the efficiency of excitation energy transfer from antenna pigments to the RCII. Any NPQ of PSII will reduce $\phi_{PSII}'$. Providing algae with higher light intensities more light is absorbed and more RCII will be reduced causing a decrease in $\phi_P'$ value with a consequently dropping on $\phi_{PSII}$ value. As defined, yield is the part of light absorbed that promotes photosynthesis. Increasing the total amount of light absorbed cause a natural decrease in efficiency charge separation on RCII promoting more NPQ leading to a decrease on $\phi_{PSII}'$. Analyzing the individual parameters $F'_m$ and $F_t$ (used to calculate $\phi_{PSII}$ on Eq. 1) Genty et al. (15) demonstrated larger drops in $F'_m$ compared to the relatively stable values of $F_t$ during increasing light intensities from 0 to 500 µmol $m^{-2}\ s^{-1}$, which leads to an overall $\phi_{PSII}$ decreases. Fluorescence analysis conducted on phytoplankton samples before and after incubation at fixed depth showed a maximum reduction in operational quantum yield of 34% on samples exposed to full solar irradiance (water surface) whereas 2 meter depth samples showed an increase of 23% when compared to their corresponding values before incubation (27). Exposing the samples to higher PPFD caused a decrease on $\phi_{PSII}$ as a consequence of more light absorption by the whole culture, reducing more RCII decreasing the efficiency of photochemical quenching under saturating light pulses.

Wavelengths

The strongest absorbed LED, $\lambda_{470\ nm}$, showed the lowest yield on samples at all OD's tested. In high density cultures, less than 1% of the blue light is transmitted through the chloroplast, thus all $\lambda_{470\ nm}$ light emitted on microalgae culture is readily absorbed by the cell layers at the surface of illumination on the cuvette, which is different from the other wavelengths tested that can have more reflection than absorption. Pickett and Myers (10) comparing monochromatic light saturation curves for photosynthesis in *Chlorella* found different monochromatic light saturation points for wavelengths on blue, red and green spectrum. Despite the fact that the maximum rate of photosynthesis is independent of wavelength within PAR spectrum to reach the same photosynthetic rate at $\lambda_{630\ nm}$ (weakly absorbed band) it was necessary to provide 5 times the light intensity used at $\lambda_{450\ nm}$ (strongly absorbed band) due differential amount of light absorbed. Providing different wavelengths at the same light intensity will cause a differential absorption of energy. The low amount of energy absorbed at $\lambda_{530\ nm}$ at OD 0.5 is fully drained by the available oxidized reaction centers, whereas at strongly absorbed wavelengths, the increased amount of energy absorbed naturally reduces more reaction centers suffering a consequential drop on $\phi_{PSII}$.

In the present disclosure, $\phi_{PSII}$ of the $\lambda_{505\ nm}$, $\lambda_{530\ nm}$ and white LED showed a significant decrease compared to the other wavelengths as the culture increases its density, changing position with $\lambda_{590\ nm}$ and $\lambda_{627\ nm}$ in the stationary phase culture (OD1.5). It suggests the better absorption by carotenoids in the blue and green spectrum of light, whereas the amount of chlorophyll increasing was not sufficient to show a significant increase of the weakly absorbed $\lambda_{590\ nm}$ and $\lambda_{627\ nm}$. Green and cyan light which can penetrate deeper into the sample is better distributed inside the cuvette allowing better and more homogenous absorbance by the carotenoids pigments present on *C. sorokiniana*. Emerson and Lewis (28) illuminated a thick layer of *Chlorella* cells with wavelengths in the blue ($\lambda_{450\ nm}$), green ($\lambda_{550\ nm}$) and red ($\lambda_{600\ nm}$) and found scattered indices by green light 2 times higher than blue and 1.65 times higher than red. Thus, these weakly absorbed wavelengths at higher OD culture are less absorbed, but more homogeneously distributed than red light in the whole culture, without saturating the reaction centers. White LED showed the lowest $\phi_{PSII}$ due its increased absorption at blue and green spectrum.

NPQ

Past studies measuring quantum yield as oxygen evolved by photosynthesis based on light incident do not take into account NPQ as one of the possible fates of absorbed light. NPQ is a complex mechanism and a difficult parameter to be understood. The drop in NPQ from samples at OD 0.5 to OD 1.0 is a response to more efficient light absorption inside the cuvette caused by self-shading as a consequence of more cells present at the sample, independent of wavelength or light intensity. The lower concentration of cells present at OD 0.5 were exposed to an excess of photosynthetic photon flux density (PPDF) saturating the photosynthetic electron transport. Samples with higher OD contain more individual cells which are exposed to reasonable levels of light achieving more efficient energy absorption overall. Intact colonies of filamentous cyanobacteria *Oscillatoria* showed much less susceptibility to photoinhibition than individual trichomes at the same high light irradiance due to the increased specific absorption coefficient caused by a reduction in self-shading (29). Increased *C. sorokiniana* OD cause similar self-shading effect observed on filamentous colonies, reducing NPQ.

Conclusion

The experimental results from the quantum yield data and light absorption spectra of *C. sorokiniana* samples at three specific OD indicate an inverted correlation between light intensity and chlorophyll a fluorescence yield ($\phi_{PSII}$) measured at specific monochromatic wavelengths as well as the full spectrum white LED. Light intensity increasing from 100 to 500 µmol m$^{-2}$ s$^{-1}$ can significantly change $\phi_{PSII}$ emissions without significantly impacting NPQ.

Wavelengths absorbed by carotenoids can provide extra $\phi_{PSII}$ drop in denser algal cultures when wavelengths weakly absorbed exclusively by chlorophylls are no longer capable of penetrating as deep into the culture to be absorbed by interior cells.

The lower yields observed at the blue light spectrum represent the high energy absorption at $\lambda_{470\ nm}$ by *C. sorokiniana* pigment content. Wavelengths on red spectrum ($\lambda_{590\ nm}$, $\lambda_{617\ nm}$ and $\lambda_{627\ nm}$) did not have a good absorption by the main pigments chlorophyll a and b. As the culture became denser moving from OD 1.0 to 1.5 no changes on $\phi_{PSII}$ were observed.

The highest light intensity source (500 µmol m$^{-2}$ s$^{-1}$) was the best option for LEDs which can provide specific wavelengths at the best spectrum with both economic and photosynthetic energy efficiency. Without being bound by any particular theory, it is suspected that at high density culture (OD>2) increasing light intensity can significantly increase the portion of the light absorbed as well as the part used to drive photosynthesis from weakly absorbed wavelengths with no significant NPQ increases. Whereas, the same increase in light intensity of strongly absorbed wavelengths, such as blue and red will not significantly change $\phi_{PSII}$, but will increase NPQ. Further studies should be conducted using higher light intensities applied to cultures with higher ODs.

References

1. Singh, S., Kate, B. N., and Banerjee, U. C., (2005) Crit Rev Biotechnol. 25, 73-95.

2. Ugwu, C. U., Aoyagi, H., and Uchiyama, H., (2008) Bioresour Technol. 99, 4021-4028.

3. Cosgrove, J. and Borowitzka, M. A. (2010), in Chlorophyll a Fluorescence in Aquatic Sciences: Methods and Applications: Chlorophyll Fluorescence Terminology: An Introduction (D. J. Suggett, O. Prášil, and M. A. Borowitzka), Springer, Dordrecht, pp. 1-17.

4. Matthijs, H. C. P., Balke, H., VanHes, U. M., Kroon, B. M. A., Mur, L. R., and Binot, R. A., (1996) Biotechnol Bioeng. 50, 98-107.

5. 2010. Available from: www.cree.com. Accessed Jan. 7, 2011.

6. Hill, R. and Bendall, F., (1960) Nature. 186, 136-137.

7. Govindjee (2004), in Chlorophyll a Fluorescence: A Signature of Photosynthesis: Chlorophyll a Fluorescence: A Bit of Basics and History (G. C. Papageorgiou and Govindjee), Springer, Dordrecht, pp. 1-42

8. Krause, G. H., (1988) Physiologia Plantarum. 74, 566-574.

9. Falkowski, P. and Kiefer, D. A., (1985) J Plankton Res. 7, 715-731.

10. Pickett, J. M. and Myers, J., (1966) Plant Physiology. 41, 90-&.

11. Muller, P., Li, X. P., and Niyogi, K. K., (2001) Plant Physiol. 125, 1558-1566.

12. Sugget, D. J., Moore, C. M., and Geider, R. J. (2010), in Chlorophyll a Fluorescence in Aquatic Sciences: Methods and Applications: Estimating Aquatic productivity from active fluorescence measurements (D. J. Sugget, O. Prášil, and M. A. Borowitzka), Springer, Dordrecht, pp. 103-127

13. Schreiber, U., Hormann, H., Neubauer, C., and Klughammer, C., (1995) Aust J Plant Physiol. 22, 209-220.

14. Weis, E. and Berry, J. A., (1987) Biochim Biophys Acta. 894, 198-208.

15. Genty, B., Briantais, J. M., and Baker, N. R., (1989) Biochim Biophys Acta. 990, 87-92.

16. Maxwell, K. and Johnson, G. N., (2000) J Exp Bot. 51, 659-668.

17. Horton, P., Ruban, A. V., and Walters, R. G., (1994) Plant Physiology. 106, 415-420.

18. Gordon, J. M. and Polle, J. E. W., (2007) Appl Microbiol Biot. 76, 969-975.

19. Matsukawa, R., Hotta, M., Masuda, Y., Chihara, M., and Karube, I., (2000) J Appl Phycol. 12, 263-267.

20. Ji, T. H., Hess, J. L., and Benson, A. A., (1968) Biochim Biophys Acta. 150, 676-&.

21. Nishimura, M. and Takamatsu, K., (1957) Nature. 180, 699-700.

22. Deroche, M. E. and Briantai. J m, (1974) Photochem Photobiol. 19, 233-240.

23. Hornero-Mendez, D. and Minguez-Mosquera, M. I., (2001) J Agric Food Chem. 49, 3584-3588.

24. Del Campo, J. A., Rodriguez, H., Moreno, J., Vargas, M. A., Rivas, J., and Guerrero, M. G., (2004) Appl Microbiol Biotechnol. 64, 848-854.

25. Biehler, E., Mayer, F., Hoffmann, L., Krause, E., and Bohn, T., J Food Sci. 75, C55-C61.

26. Wang, C. Y., Fu, C. C., and Liu, Y. C., (2007) Biochemical Engineering Journal. 37, 21-25.

27. Gilbert, M., Domin, A., Becker, A., and Wilhelm, C., (2000) Photosynthetica. 38, 111-126.

28. Emerson, R. and Charlton, M. L., (1943) Am J Bot. 30, 165-178.

29. Lewis, M. R., Ulloa, O., and Platt, T., (1988) Limnology and Oceanography. 33, 92-98.

It should be noted that ratios, concentrations, amounts, and other numerical data may be expressed herein in a range format. It is to be understood that such a range format is used for convenience and brevity, and thus, should be interpreted in a flexible manner to include not only the numerical values explicitly recited as the limits of the range, but also to include all the individual numerical values or sub-ranges encompassed within that range as if each numerical value and sub-range is explicitly recited. To illustrate, a concentration range of "about 0.1% to about 5%" should be interpreted to include not only the explicitly recited concentration of about 0.1 wt % to about 5 wt %, but also include individual concentrations (e.g., 1%, 2%, 3%, and 4%) and the sub-ranges (e.g., 0.5%, 1.1%, 2.2%, 3.3%, and 4.4%) within the indicated range. The term "about" can include ±1%, ±2%, ±3%, ±4%, ±5%, ±6%, ±7%, ±8%, ±9%, or ±10%, or more of the numerical value(s) being modified. In an embodiment, the term "about" can include traditional rounding according to significant figures of the numerical value. In addition, the phrase "about 'x' to 'y'" includes "about 'x' to about 'y'".

It should be emphasized that the above-described embodiments of the present disclosure are merely possible examples of implementations, and are merely set forth for a clear understanding of the principles of the disclosure. Many variations and modifications may be made to the above-described embodiments. All such modifications and variations are intended to be included herein within the scope of this disclosure and protected by the following claims.

Therefore, at least the following is claimed:

1. A biological optimization system for enhancing photosynthetic efficiency of a photosynthetic organism, said system comprising:
   the photosynthetic organism;
   a source of pulsed light providing a pulsed light having an output characterized by an intensity and a spectral composition; and
   a chlorophyll fluorometer,
   wherein the spectral composition of the output from the source of pulsed light changes by decreasing the intensity of wavelengths of said light that are strongly absorbed by a culture or canopy of the photosynthetic organism, and increasing the intensity of wavelengths that are weakly absorbed by the culture or canopy of the photosynthetic organism to allow deeper penetration of light energy into the culture or canopy of the photosynthetic organism.

2. The biological optimization system of claim 1, wherein the illumination applies blue (440-490 nm) and red (600-680 nm) light to the culture or canopy of the photosynthetic organism and the culture or canopy has strong absorption in the blue (440-490 nm) and red (600-680 nm) regions.

3. The biological optimization system of claim 2, wherein the culture or canopy of the photosynthetic organism increases its density during cultivation so as to reduce light penetration into the culture or canopy and inducing increased energy dissipation as heat (NPQ), wherein the biological optimization system decreases the intensity of blue and red illumination and replaces the intensity of illumination with colors having higher reflection, wherein the colors having higher reflection are selected from the group consisting of: cyan (495-515 nm), green (520-540 nm), orange/amber (565-595 nm), and a combination thereof.

4. The biological optimization system of claim 1, wherein the photosynthetic organism is a plant utilizing chlorophyll as an energy collector/converter.

5. The biological optimization system of claim 4, wherein the photosynthetic organism is selected from the group consisting of: microalgae, macroalgae, terrestrial plant, a host organism containing a photosynthetic symbiotic organism, and a combination thereof.

6. The biological optimization system of claim 5, wherein the microalgae is *Chlorella sorokiniana, Chlorella minutissima*, or a combination thereof.

7. The biological optimization system of claim 1, wherein the source of pulsed light is a light emitting diode (LED) illuminating system.

8. The biological optimization system of claim 1, wherein the chlorophyll fluorometer provides chlorophyll fluorescence feedback data to a chlorophyll fluorescence feedback control system, wherein the chlorophyll fluorescence feedback control system adjusts the output of the source of pulsed light.

9. The biological optimization system of claim 8, wherein the chlorophyll fluorescence feedback data includes one or more of the following: photosynthetic efficiency, photochemical processing (qP), or thermal dissipation (NPQ or qN).

10. The biological optimization system of claim 8, wherein the chlorophyll fluorescence feedback data is utilized to adjust one or more of the following: a pulse rate, pulse on/off duration, light intensity, or light spectrum of the source of pulsed light to provide precisely enough light to excite the photosynthetic organism without oversaturation and photo-inhibition with less energy loss through heat dissipation (NPQ).

11. The biological optimization system of claim 10, wherein the pulse rate is selected from the group consisting of: about 500 Hz, about 1,000 Hz, about 2,000 Hz, about 2,500 Hz, about 3,000 Hz, about 3,500 Hz, about 4,500 Hz, about 5,000 Hz, about 10,000 Hz, about 20,000 Hz, about 50,000 Hz, and a combination thereof.

12. The biological optimization system claim 10, wherein one or more of the following: the pulse rate, the pulse on/off duration, the light intensity, and the light spectrum, is adjusted during illumination based upon the chlorophyll fluorescence feedback data in real time.

* * * * *